United States Patent [19]
Hart et al.

[11] Patent Number: 5,560,124
[45] Date of Patent: *Oct. 1, 1996

[54] AUTOMATIC CYCLE TERMINATOR FOR DRYERS

[76] Inventors: Douglas R. S. Hart, 94 Yarmouth Rd., Toronto, Ontario, Canada, M6G 1W9; David M. Jones, 19 Brentwood Dr., Dundas, Ontario, Canada, L9H 3N2

[*] Notice: The term of this patent shall not extend beyond the expiration date of Pat. No. 5,193,292.

[21] Appl. No.: 244,888

[22] Filed: Jun. 10, 1994

Related U.S. Application Data

[63] Continuation-in-part of PCT/CA92/00544, Dec. 10, 1992

[30] Foreign Application Priority Data

Dec. 10, 1991 [GB] United Kingdom ............... 9126200.6
Apr. 9, 1992 [CA] Canada ...................... 2065684-1

[51] Int. Cl.⁶ .................................................. F26B 3/00
[52] U.S. Cl. ................................. 34/493; 34/535; 34/572
[58] Field of Search .......................... 34/493, 549, 572, 34/527, 535

[56] References Cited

U.S. PATENT DOCUMENTS 3,239,945   3/1966   Cobb et al. .
4,112,589   9/1978   Palfrey et al. .
4,132,008   1/1979   Deschaaf .
5,193,292   3/1993   Hart et al. .................. 34/527 X

FOREIGN PATENT DOCUMENTS 0329922   8/1989   European Pat. Off. .
0436374   7/1991   European Pat. Off. .

*Primary Examiner*—Hoang Nguyen
*Attorney, Agent, or Firm*—Shoemaker and Mattare, LTD.

[57] ABSTRACT

A control device which may take the form of a plug adaptor is able to interrupt the power to a dryer when the load is dry. The only input is the pattern of the power consumption of the dryer, and this is used, together with a control algorithm, to provide the information needed for the control decision. The device, which provides a superior process for determining the cycle termination point, could also be incorporated directly into the dryers at the point of manufacture. In addition, the invention can correlate the moisture level and character of the laundry load with the pattern of power consumption of the clothes dryer. This correlation may be used to further optimize the performance of the drying cycle or to provide load-specific control and termination procedures.

46 Claims, 36 Drawing Sheets

CURVE FITTER ROUTINE

RULE 2 PROCESS

GATING CONTROL RULE FOR RULES 5 AND 6

BENCH MARK RULE

AUTOMATIC CYCLE TERMINATOR FOR DRYERS

This is a continuation-in-part of PCT International Application No. PCT/CA92/00544 filed Dec. 10, 1992.

This invention relates to the control of dryers in general and in particular to electrically powered clothes dryers for residential use.

BACKGROUND OF THIS INVENTION

Many electric clothes dryers have an automatic setting for the purpose of terminating the cycle when the clothes are dry, to save energy. However, many of the dryers now in use do not have this feature, and independent tests indicate that many models incorporating automatic termination still over-dry the clothes, thereby wasting up to 20% of the electricity or more.

Conventional automatic termination systems in dryers today may use the dryer temperature or the humidity of the air or the electrical conductivity of the load itself to determine when to terminate the cycle. Frequently, the decision is made by allowing a given amount of heater-on or heater-off time to elapse after a predetermined threshold is reached. This elapsed time is usually determined by a user set point on the control dial of the dryer.

Consumer reports and tests by others indicate that while these automatic shut-off mechanisms are somewhat effective, they frequently overdry the loads, in many cases running longer than necessary, after the load is dry. This not only wastes energy, but it causes unnecessary wear on the fabric and to the dryer itself.

GENERAL DESCRIPTION OF THIS INVENTION

This invention seeks to improve upon the current means of control and in addition to provide a simple retrofit means whereby this improved control can be extended to existing clothes dryers, without modification to the interior wiring of the dryer itself.

The improved means of control derives from two sources. First, it is recognized that since dryers seek to maintain an average air temperature in the drum during the drying cycle, then as the load dries, less and less power is required by the dryer to maintain this temperature as the quantity of water evaporating is reduced. This creates a relationship between the pattern of power used by the dryer and the moisture level and character of the load being dried. Hence by monitoring the power used by the dryer a means can be provided to determine the end point of the drying cycle, which is not vulnerable to the drift of a sensor or to variations in any other external input.

Secondly, in this invention, the determination of dryness is not based on one or two input variables or thresholds (such as a humidity threshold, or a user set point), but rather on a series of data derived from the energy used by the dryer heater. Through the use of a microcomputer and continuous input data, more accurate information may be derived regarding the condition of the load and its termination point. This control method is also more responsive to different cycles, laundry loads, dryer types and operating conditions, since for each load, the control mechanism adapts to the pattern of power use for that particular load and dryer cycle.

This invention also seeks to provide a product that can be fitted easily to existing dryers. In such retrofit applications, the product can be installed without interfering with the internal wiring of the dryer. In the case of a domestic clothes dryer, both the power sensing means and the controlling means may be incorporated into a plug adaptor, thus requiring almost no expense for installation and no alteration of existing electrical components inside the dryer. Unlike other electrical adaptors which provide timer or control functions, the device does not require external inputs or threshold set-points. Rather, it uses continuous data derived from the power transmitted through the device itself.

In typical North American use, the device and its means of control are estimated to save at least 180 kWh per year per clothes dryer. It is recognized that the control means described herein may apply equally to a control system that is installed interior to new dryers as to a retrofit application for existing dryers.

Not only does the invention save energy, but by preventing overdrying, it saves fabric wear. In addition, by reducing the running time of the dryer, it may extend the lifetime of the dryer itself. By providing a more effective control, the device also provides the convenience to the user of knowing that when the dryer stops, the laundry is ready and not overdried, or still damp. An additional convenience is provided by cutting back on wasted time, thereby shortening the laundry cycle.

This invention operates by continuously sensing the power level used by the dryer and, through the use of a logic algorithm and a microcomputer, determining the level of dryness of the load. In the case of a retrofit to existing clothes dryer, the device can terminate the cycle by temporarily interrupting the power to the dryer when the laundry is dry. With many dryers, a power interruption to the dryer motor trips the reset button on the dryer itself, thus terminating the cycle. By using the safety reset function of the dryer itself, the need for a separate reset on the device itself is avoided.

The logic of the device rests on the fact that temperature limits are maintained by the dryer during operation. As moisture is eliminated from the load, less and less power is required to maintain the dryer at temperature. By monitoring the pattern of power use and by the application of a software algorithm, the device can determine when dryness is achieved and terminate the cycle. The software algorithm relies on the pattern of power use of the heater during the drying process. Particular patterns are characteristic of particular loads and drying conditions. Furthermore, experience with the particular dryer where it is installed may also allow the device to "learn" and refine its termination routine, thereby improving its performance over time on a given dryer.

As a further refinement of the invention in many types of domestic clothes dryers, it is possible to terminate the heater portion of the electrical supply independently of the dryer motor portion, since the motor often uses only one side of the 220 volt supply line, whereas the heater usually requires both sides. By sensing the electric current in the independent conductors, the invention is able to determine the wiring arrangement of the motor and heater within the dryer. If the non-motor side only is interrupted, then with many dryers the motor will continue to operate and the drum will turn; however, the heater will be off. This "cool-down" feature is desirable because it prevents the clothes from lying in a heap and wrinkling in a stationary dryer. At the same time it makes use of the "free heat" latent in the drum and clothing, to provide additional drying without the large power level used by the heater. This provides additional energy saving. This feature would be particularly attractive for permanent press clothing and could be user selectable through a switch on the unit or on a remote keypad.

Since different fabric types show different power patterns during drying, it is possible in many cases by means of this invention to distinguish a certain load type, such as permanent press, and apply a different "cool-down" procedure which is automatically selected by the software.

Since different fabric types feel dry to the touch at different levels of moisture, the different power patterns can also be used to target different moisture levels which are appropriate for the individual fabric types. For example, cloth that is largely synthetic often does not feel dry until it has reached a 1% or 2% moisture level, however natural fabrics, in particular tight weaves such as blue jeans can feel dry at higher moisture levels, often up to 5% or 6%. The discrimination between these groups can provide a more accurate termination routine in the invention. This in turn provides more savings and less fabric wear.

During normal operation in most dryers, the heater is switched on and off by thermostats in a periodic manner, to maintain the load within a certain temperature range. A refinement of the operation of the device could allow termination to occur only toward the end of a power-off phase of the heater cycle. This would prevent electrical arcing and wear on the relay contacts that are often associated with the switching of high current loads. By allowing the dryer to run for a period in this power-off phase, rather than simply shutting off the system, the heat latent in the drum and the clothes is also put to good use. This also provides a period of time where an audible alarm can sound to warn users that the laundry is ready.

It is recognized that this control strategy could be applied to other types of dryers in commercial and industrial applications, or to any situation where the dryer load is constant and fixed temperature limits are maintained. Non-electric dryers would also be suitable for this invention. It is also recognized that the control strategy described herein could be built in to new dryers, as a means of providing superior control of the drying cycle.

As an option, the device could also include a control keypad that is connected by a wire, or by other communication means, and mounted on the control panel of the dryer. The control keypad could allow enhanced user control of the dryness of the load, or provide an override feature on the device, or engage the permanent press feature, if desired. The unit could also incorporate an LED or other indicator on the keypad or on the case of the adaptor itself, to indicate proper operation.

Another refinement of the device could be incorporated to make it even more effective for particular makes or models of dryers. In such cases, selection switches or dip switches may be incorporated into the product to refine the algorithm for the particular dryer characteristics. Where the device is incorporated into the dryer itself, such refinements could be pre-adjusted and not require selection.

In cases where the control means described herein is incorporated into new dryers, it can also take advantage of other information, such as the user-selected dryer settings, to further refine its decision process.

A further embodiment of the invention could take the form of a retrofit device for dryers without plugs, that is, dryers that are wired directly into the building wiring. In this scenario, the device would incorporate terminal block(s) and/or dryer cord(s) in place of the plug and receptacle components of the "plug adaptor" version of the invention. It would be installed by wiring the device in series with the dryer. The invention could also be incorporated into the dryer plug itself.

This invention provides a means of relating the moisture condition and character of the laundry load to the pattern of power consumption of the dryer. In addition to allowing a more precise termination of the laundry cycle, this relationship can provide other important control information and operational features in the laundry cycle. For example, certain users prefer to remove their clothing from the dryer in a slightly damp condition, ready for ironing. The control means provided by this invention could allow the selection of this condition by the user, either by a keypad, as described above, or as part of the dryer control, if incorporated into new dryers.

As a further example of enhanced operation, it is contemplated that the control means provided by this invention could provide a method of increasing the dryer efficiency during the cycle itself, in addition to the more efficient termination of the cycle already described. This increase in efficiency is achieved by allowing an improved control of the air flow rate passing through the dryer. This control feature would apply to the case where the invention is incorporated into the dryer itself. This is explained in the following paragraphs.

For many installed dryers, the air flow rate during operation is higher than required for adequate drying. In other words, the air leaving the dryer is often not saturated and this surplus air flow creates an unnecessary and wasteful demand on the dryer heater. In many cases, dryer manufacturers must design their dryers to meet the worst case in terms of restrictive air venting arrangements and this worst case design approach leads to a surplus air flow rate in many installations. This is particularly true later in the drying cycle, when the rate of moisture dissipation may be reduced. Furthermore, certain fabrics, such as some synthetics, tend to give off moisture much more readily at the beginning of the drying cycle and may require a higher initial air flow rate than other fabrics which tend to retain their moisture for a longer time.

Because this invention provides a means of correlating the moisture of the laundry load with the pattern of the power demand of the dryer, it is contemplated that this information could be used to determine the rate of moisture loss and, with the possible help of an air flow sensor, the degree of saturation of the air stream exiting the dryer. By the use of a device such as a variable flow restrictor, this invention could then create an appropriate reduction in the air flow rate through the dryer. If necessary, it could further recheck the effect of this reduction by continuing to monitor the power pattern of the dryer, in this way providing a feedback loop that optimizes the performance of the system.

The invention could also provide a safety feature by recognizing an aberrant current draw in the dryer and then shutting off the power to the dryer. For example, it is possible that both the safety thermostat and the control thermostat of a dryer could fail, leading to a prolonged heater-ON time period that could cause combustion in the dryer. In many cases, this could be recognized by the microprocessor, and a shut down routine triggered.

More particularly, this invention provides a method of controlling a drying machine to which energy is fed along at least one conduit, the drying machine having means establishing a variable energy consumption, such that, as the contents of the drying machine approach a dry condition, the amount of energy consumed per unit time changes in a pattern which depends on the amount and nature of the contents and the characteristics and operating conditions of the drying machine, the method comprising the steps:

a) monitoring the said pattern of energy consumption, and b) through analysis requiring only said pattern of energy consumption with respect to time, determining when a desired level of dryness is achieved and thereupon reducing the flow of energy used by the drying machine.

Further, this invention provides, for use in conjunction with a drying machine to which energy is fed along at least one conduit, the drying machine having means establishing a variable energy consumption such that, as the contents of the drying machine approach a dry condition, the amount of energy used per unit time changes in a pattern which depends upon the amount and nature of the contents and the characteristics and operating conditions of the drying machine, a control device comprising:

a) first means for monitoring the pattern of energy used per unit time, and b) second means receiving data from said first means and adapted, through an analysis requiring only said pattern of energy consumption with respect to time, to determine when a desired level of dryness is achieved, whereupon the second means reduces, the flow of energy along said at least one conduit.

Additionally, this invention provides, in combination:

A. a drying machine to which energy is fed along at least one conduit, the drying machine having means establishing a variable energy consumption such that, as the contents of the drying machine approach a dry condition, the amount of energy used per unit time decreases in a pattern which depends upon the amount and nature of the contents and the characteristics of the drying machine, and B. a control capability comprising:

a) first means for monitoring the pattern of energy consumption with respect to time, and b) second means requiring only data from said first means pertaining to the pattern of energy consumption with respect to time and adapted, when the pattern of energy consumption with respect to time indicates a desired level of dryness, to reduce the flow of energy along said at least one conduit, the control capability being built into the drying machine.

Further, this invention provides, in combination:

A. a clothes drying machine incorporating a heater, a drum, a motor rotating the drum, and an air blower run by said motor, electrical energy being fed to the heater and the motor along two "live" electrical wires of a 220-volt electrical supply which further includes a neutral wire and a ground wire, all wires proceeding from a plug having prongs for insertion into an appropriate receptacle, the machine having a built-in safety feature whereby it shuts down the machine's use of the electrical energy by the heater and motor whenever there is an interruption in the availability of electrical energy to the motor, the drying machine having means establishing a variable energy consumption such that, as the contents of the drying machine approach a dry condition, the amount of energy used per unit time decreases in a pattern which depends upon the amount and nature of the contents and the characteristics of the drying machine, and B. a control device comprising:

a) first means for monitoring the pattern of energy consumption with respect to time, and b) second means requiring only data from said first means pertaining only to the pattern of energy consumption with respect to time and adapted, when the pattern of energy consumption with respect to time indicates a desired level of dryness, to reduce the flow of electrical energy in at least one of said "live" wires, the control device being separate from the drying machine, and incorporated into an adaptor unit having prongs for insertion into an appropriate receptacle, and itself defining a receptacle for the prongs on the said plug for the said drying machine, said adaptor unit also containing said first and second means.

Finally, this invention provides a method of controlling a drying machine to which energy is fed along at least one conduit, the drying machine having means establishing a variable energy consumption, such that, as the contents of the machine dry, the amount of energy consumed per unit time changes in a pattern which depends upon the amount and nature of the contents and the characteristics and operating conditions of the drying machine, the method comprising the steps:

a) monitoring the said pattern of energy consumption, b) the carrying out an analysis requiring only the said pattern of energy consumption to identify the occurrence of an energy flow surplus with respect to the condition and drying pattern of the contents, and c) when such surplus occurs, reducing the flow of energy used by the machine.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
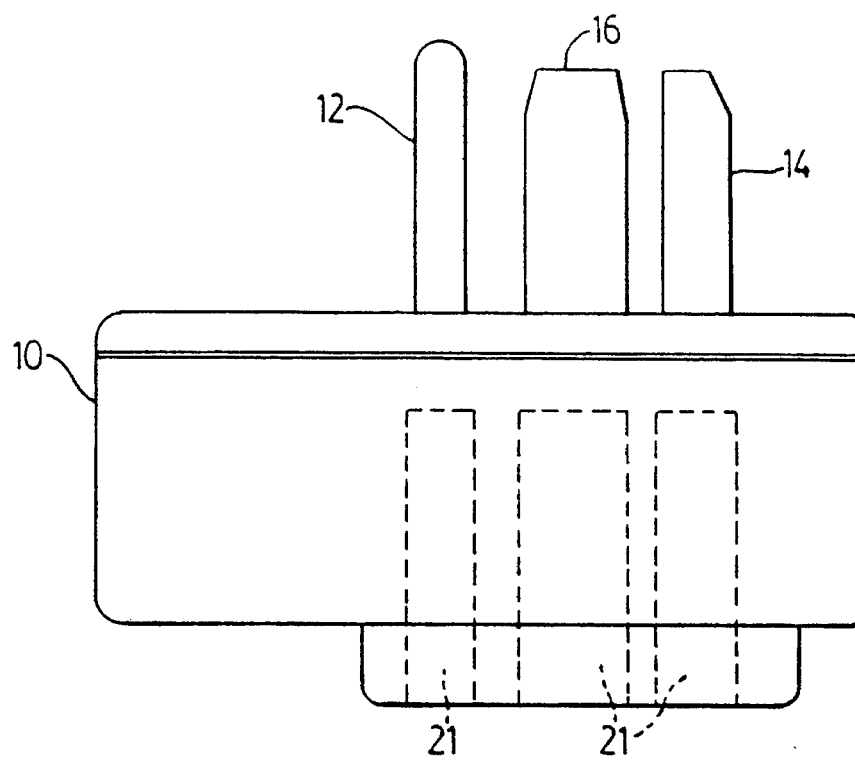
FIG. 1 is a side elevational view of the special adaptor of this invention, showing how it interacts with the dryer plug.

In FIG. 1 the adaptor is shown at 10, and is seen to incorporate the usual prongs for insertion into the standard four-prong wall receptacle for a clothes dryer. Specifically, the prongs include a ground 12, a neutral 14 and two "live" prongs 16 between which the voltage is approximately 220 volts, for standard dryers. In FIG. 1, the nearer live prong 16 hides the further live prong.

Figure 2:
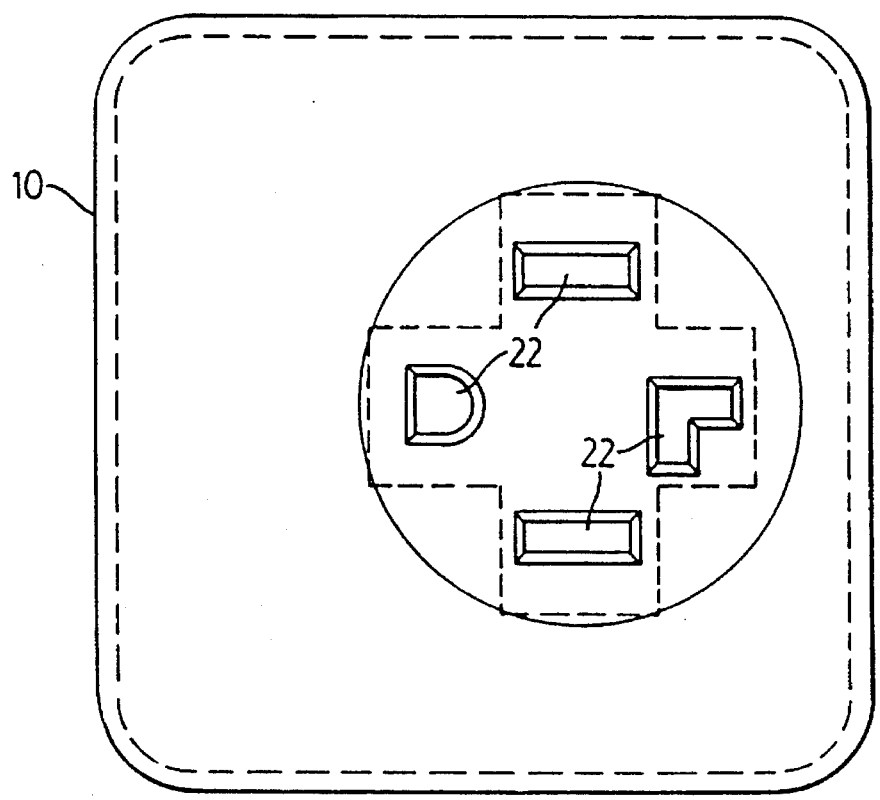
FIG. 2 is a bottom plan view of the adaptor shown in FIG. 1.

The adaptor 10 is intended to function in place of the standard wall receptacle 15 for a dryer plug 18 (see FIG. 4) which also incorporates a ground prong, a neutral prong 17 and two "live" prongs 19 and 20. These latter prongs enter suitable receiver openings in the adaptor 10 these openings being illustrated in broken lines 21 in FIG. 1 and in solid lines 22 in FIG. 2.

Figure 5:
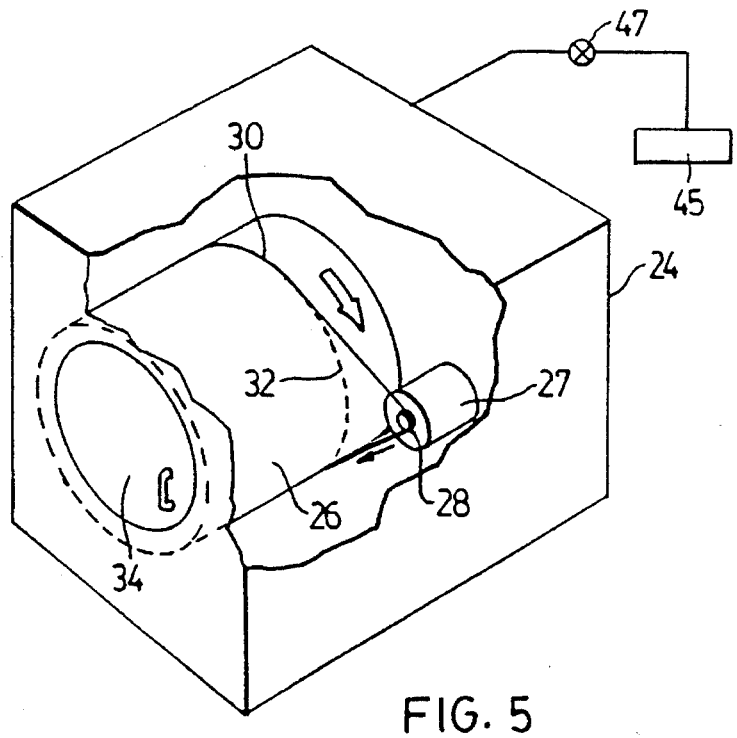
FIG. 5 is a partly broken-away, perspective view of a dryer of the kind contemplated by the present invention.
Figure 60:
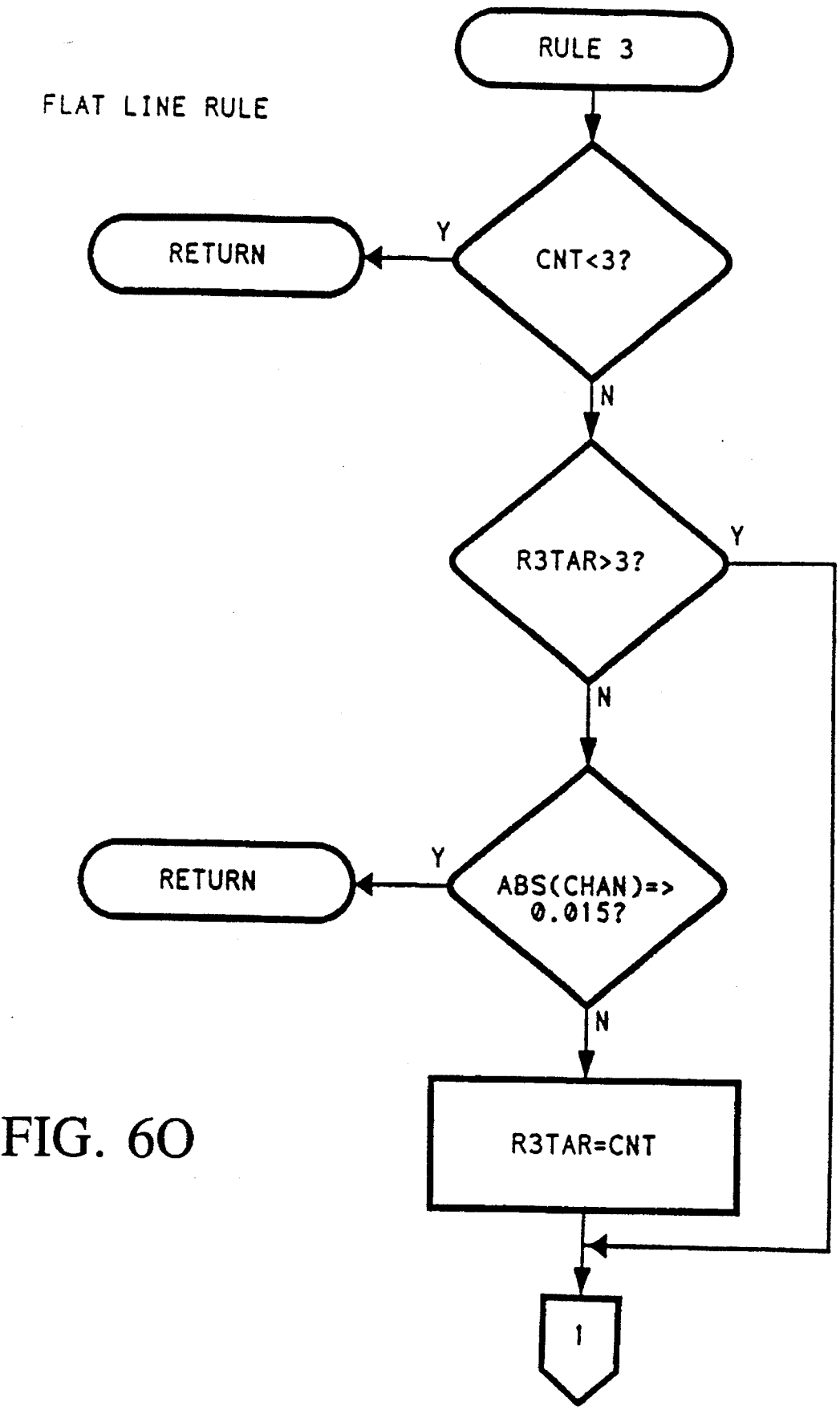

FIG. 5 is a partly broken-away perspective view of a dryer 24 which incorporates a drum 26, an electric motor 27 which rotates a small pulley 28 around which is entrained a belt 30 which may follow a groove 32 in the outside of the drum 26. Typically, a circular door 34 in the casing of the dryer 24 permits access to the interior of the drum 26.

Figure 3:
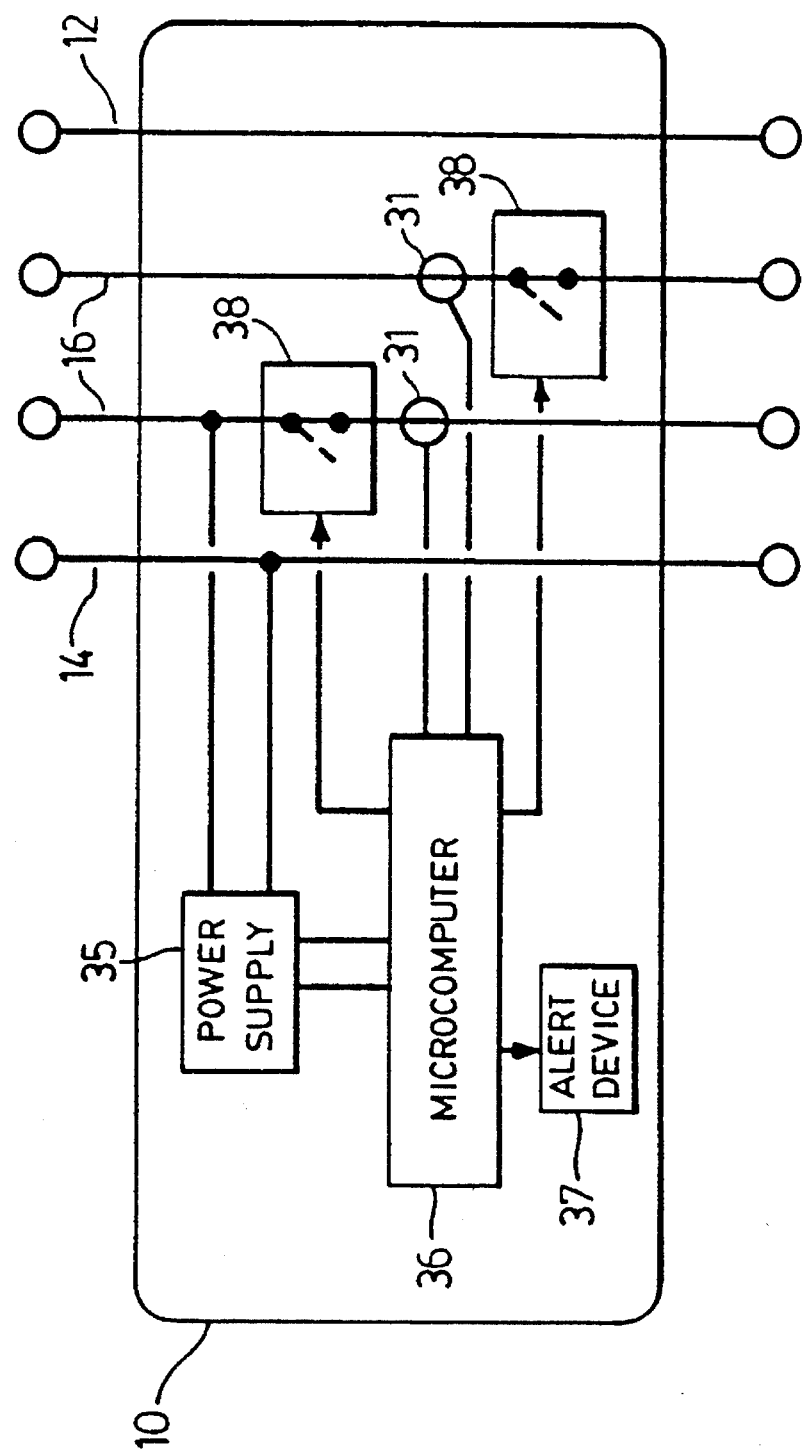
FIG. 3 is a block diagram of the major electronic components of this invention.

Attention is now directed to FIG. 3. The decision process for cycle termination is handled by a microcomputer 36 which is mounted inside the casing of the adaptor 10. The microcomputer may be powered by a power supply 35, connected to the line power. The microcomputer 36 monitors the process of the drying cycle using current sensing devices 31, which are isolated from the line voltage.

The current sensing devices 31 give information about the actual amount of current or power draw in each conductor and this can allow the microcomputer 36 to determine the power consumption of the heater(s) of the dryer (in the case of an electric dryer) as well as that of the electric motor. In addition, the microcomputer can evaluate the pattern of the power consumption of the dryer heater(s). This can be expressed as a duty cycle, or ratio of ON to OFF time, as an indicator of the power consumption of the dryer, and may be used for purposes of calculating the dryness of the load. In the case of non-electric fuels, sensors could determine the pattern of power consumption by other means, for example by sensing the ON and OFF time of a gas valve.

With this information, and a software algorithm which evaluates the pattern of power use for the load being dried, the microcomputer 36 calculates or forecasts the point at which the moisture of the load is appropriate for cycle termination. In many cases, this moisture level is between 1% and 5% of the bone dry weight. Termination may be accomplished by momentarily interrupting the power conductors (connected to prongs 16) of the dryer, using solid state switches or relays 38. In the case where it is desirable to interrupt only the heater and leave the dryer tumbling, only one conductor of the 220 V line could be interrupted, and only for a period of time to allow the clothes to cool "in motion". After this period, the second conductor could be momentarily interrupted, terminating the tumbling.

Optionally, the adaptor can activate an alert device 37, such as a light or sound signal, when it terminates the dryer operation, much like a microwave oven, in order to notify the user that operation has been completed. In some conditions, the sound signal could start with a gentle signal prior to termination, to warn users that termination was coming. This would prepare the user to allow him to remove the clothing exactly on termination, thus avoiding wrinkles that build up when the load stands in the dryer.

Figure 4:
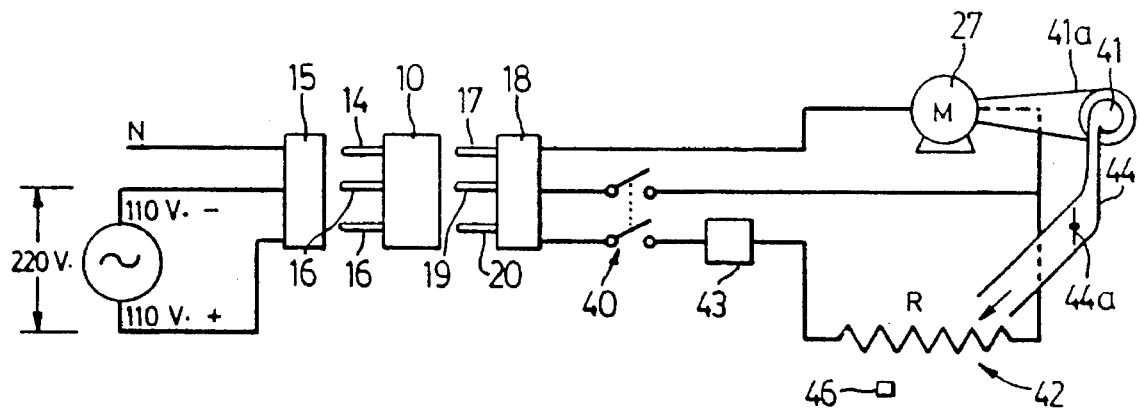
FIG. 4 is a simplified schematic drawing showing the essential hook-up for a dryer, showing how the invention interacts with the dryer plug and the receptacle.

Attention is now directed to FIG. 4, which shows a simplified wiring diagram to illustrate the position of the adaptor. At the left in FIG. 4, two wires are shown which carry 110 V each, oppositely phased. Also illustrated is a two-pole single-throw switch 40 which is adapted to open both of the "live" lines simultaneously. This switch represents the normally much more complicated switching arrangement built into a standard domestic or industrial dryer. FIG. 4 illustrates the motor 27, a thermostat 43, and also a resistance 42 which represents the heating element which supplies heat to the inside of the drum 26.

Also illustrated in FIG. 4 is an air blower 41 powered from the motor 27 through a drive belt 41a to blow air along a conduit 44 optionally containing a variable flow restrictor 44a.

In FIG. 5, an option is shown whereby the heating element for the dryer can be powered by a fluid fuel, such as natural gas. A source of such fuel under pressure is shown at 45, from which a fuel line, having a controllable valve 47, extends to the dryer 24.

Figure 6A:
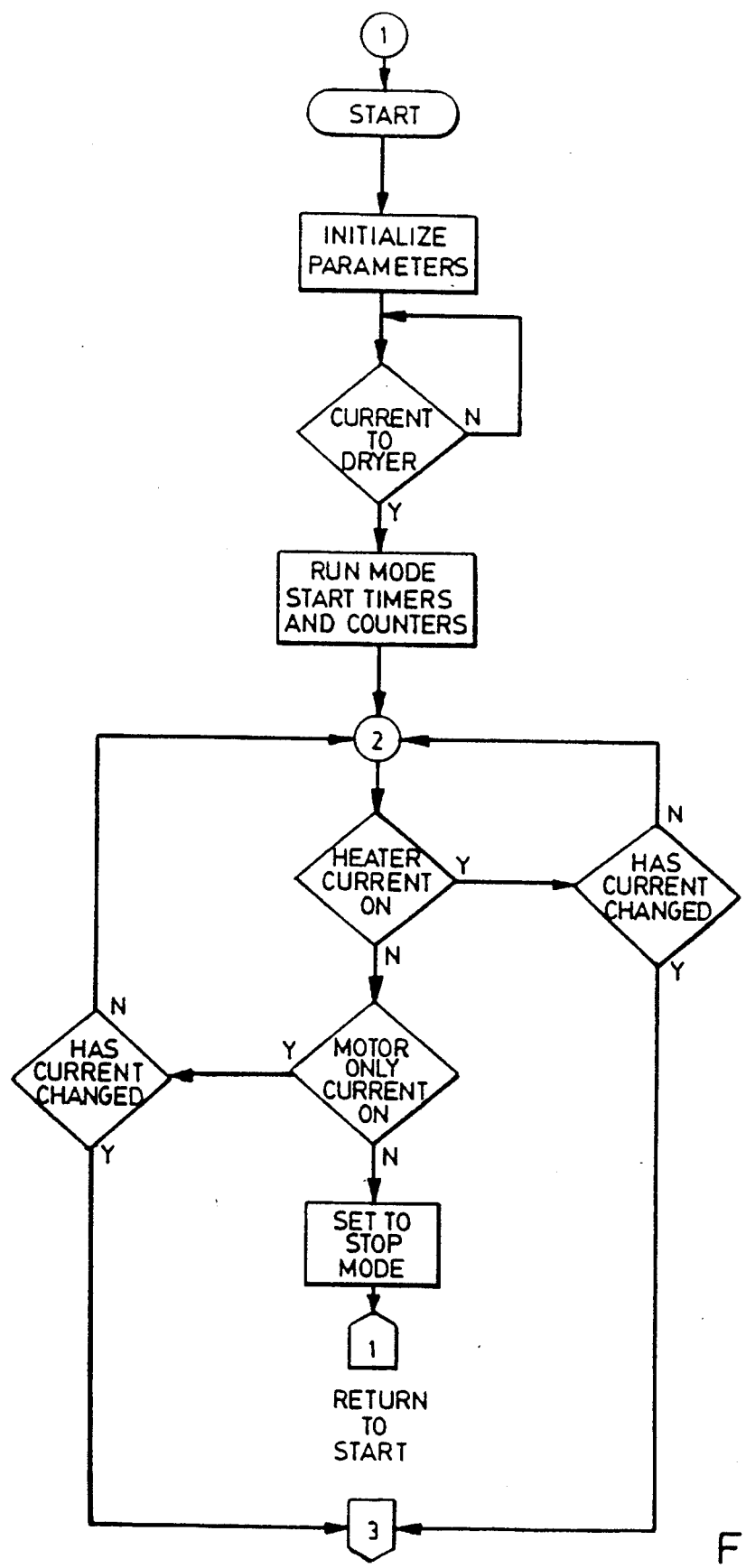
FIG. 6 (A to A7) shows various detailed logic flow charts for subroutines which can be utilized by a microprocessor performing this invention.
Figure 6B:
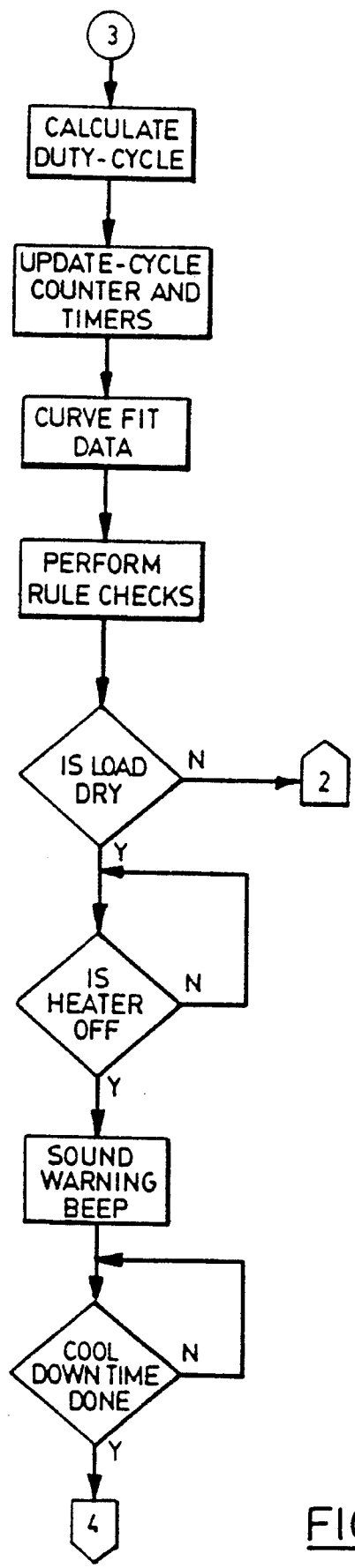
Figure 6C:
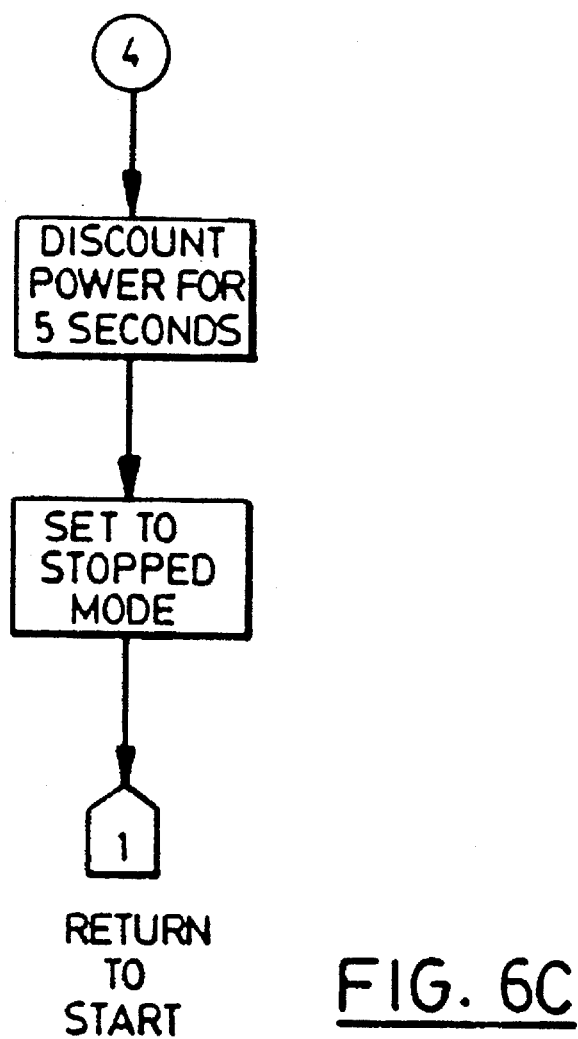
Figure 6D:
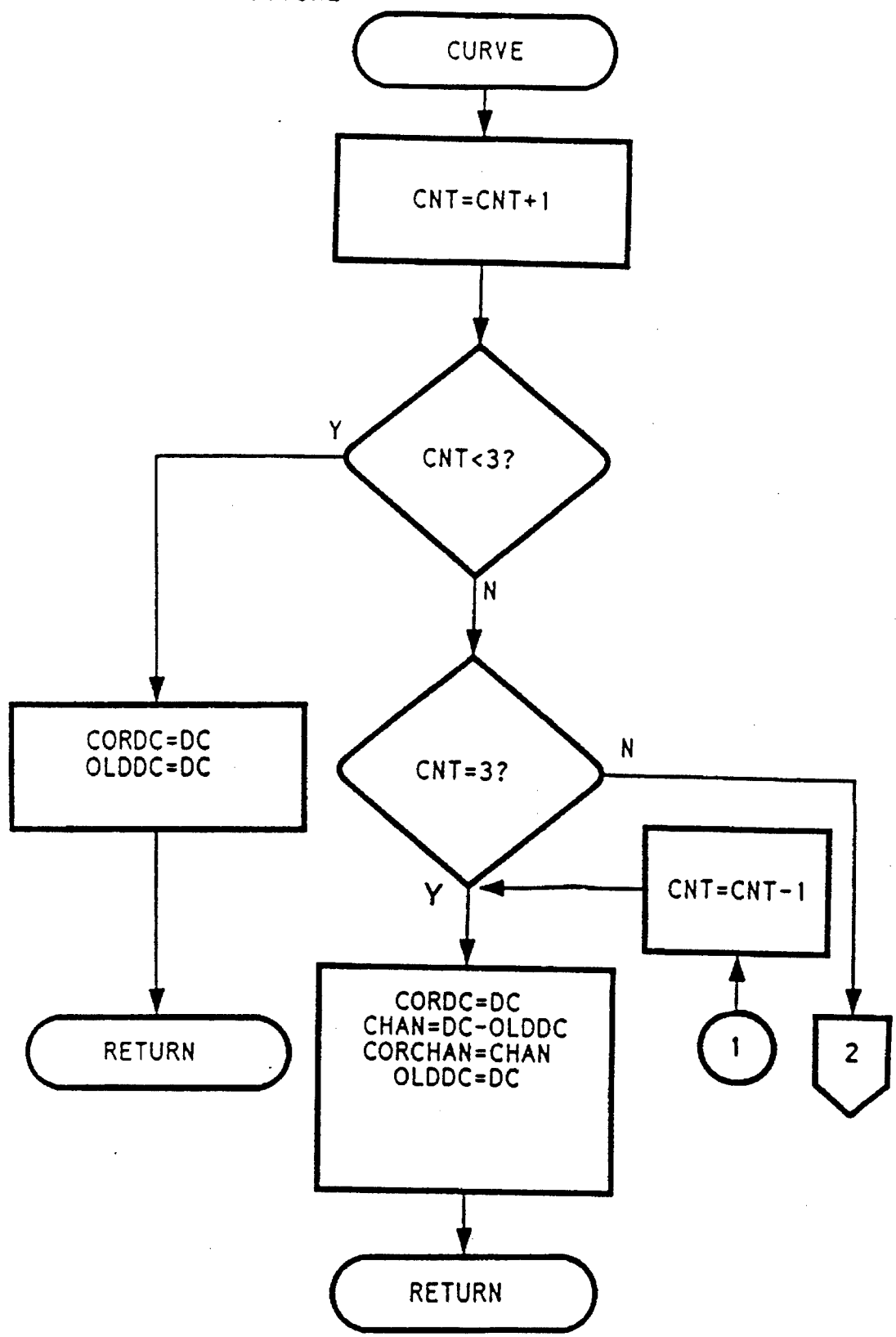
Figure 6E:
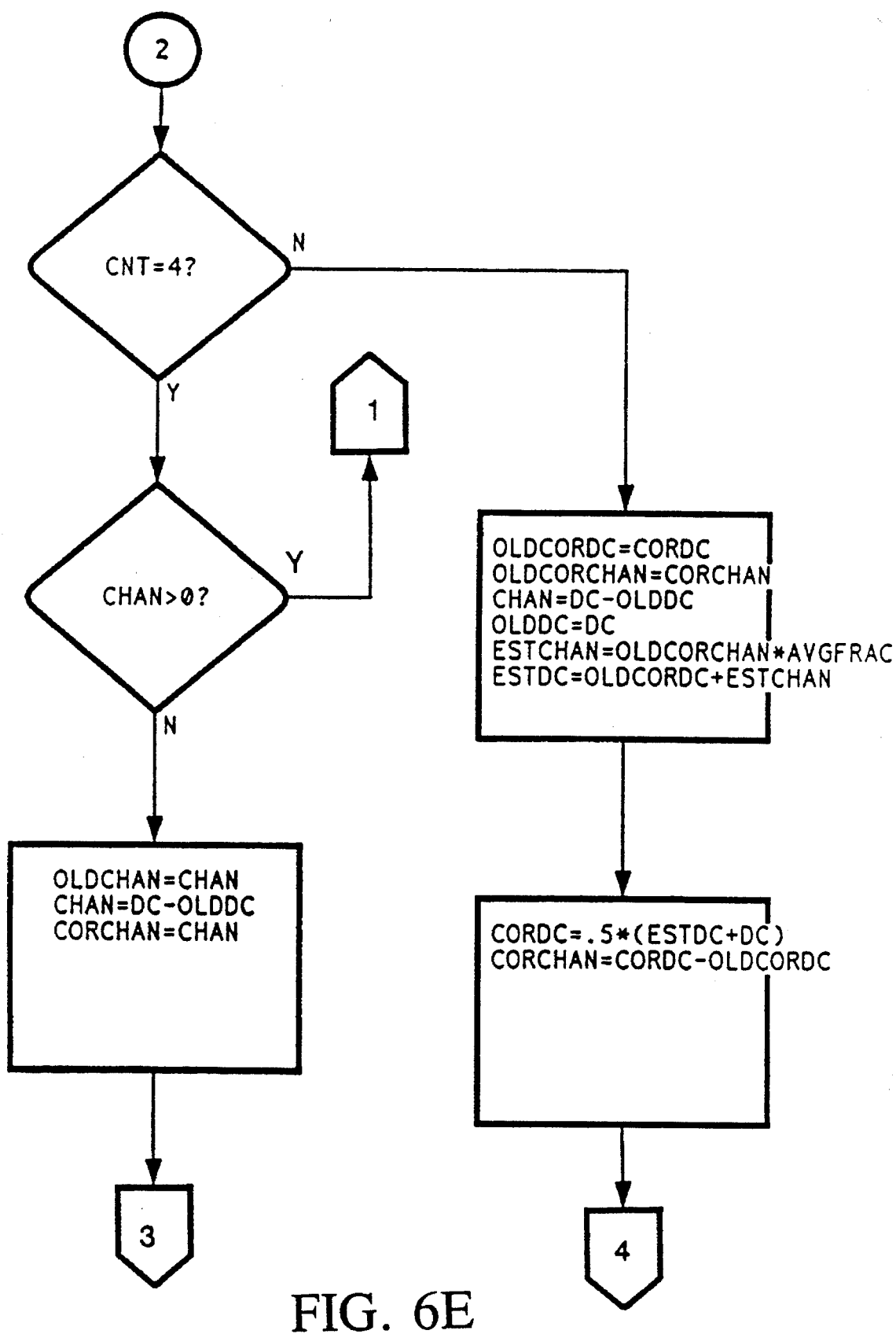
Figure 6F:
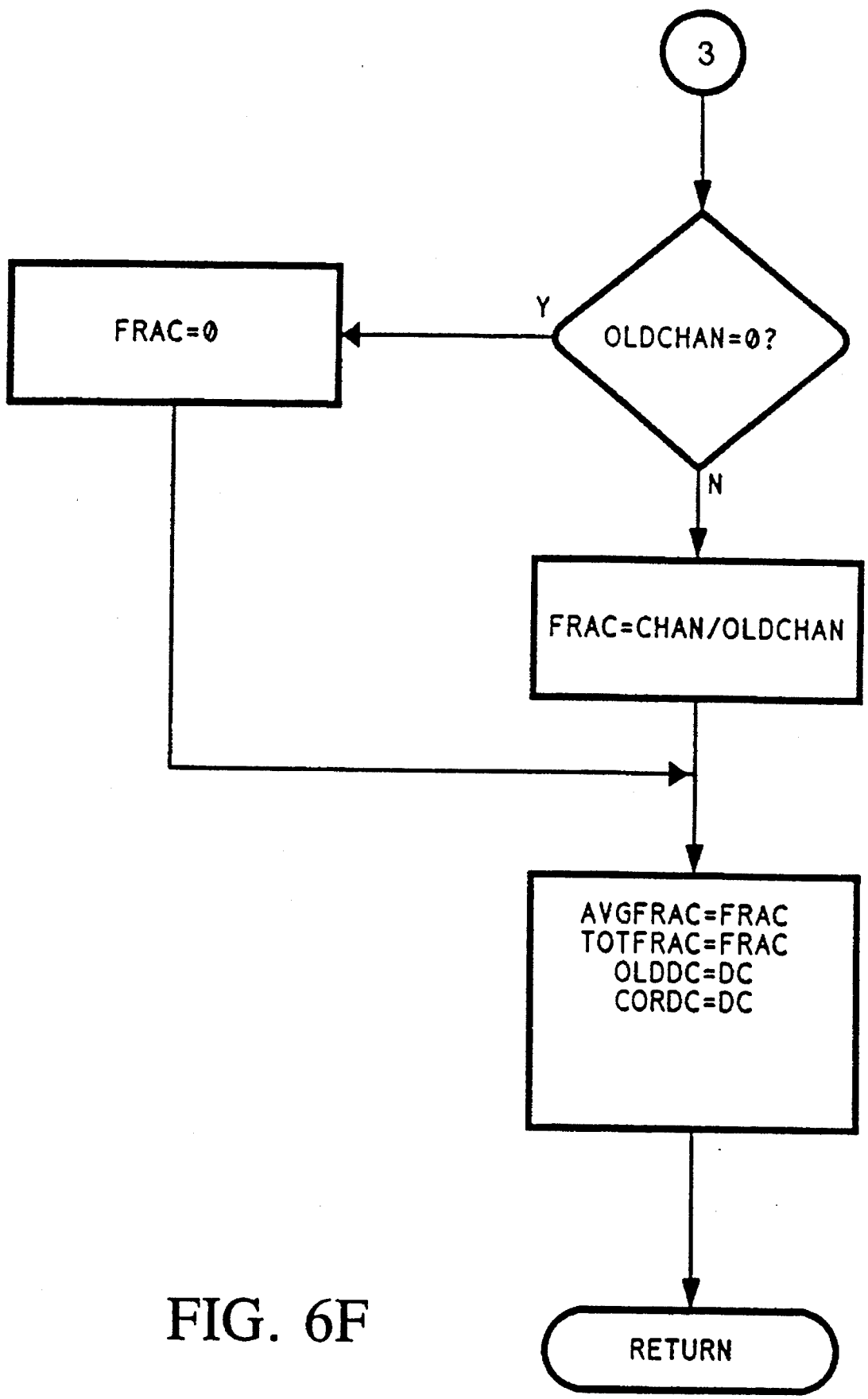
Figure 6G:
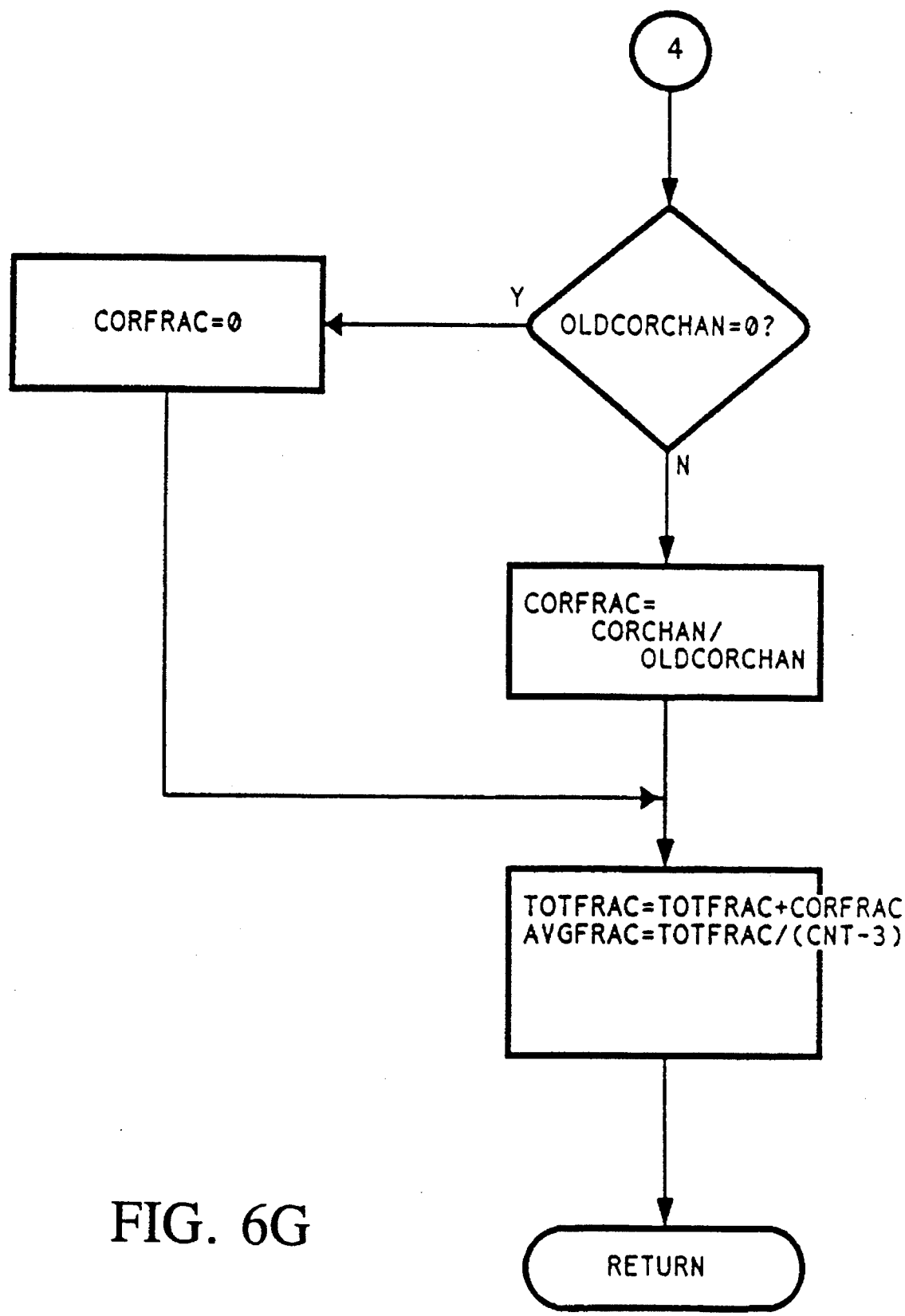
Figure 6H:
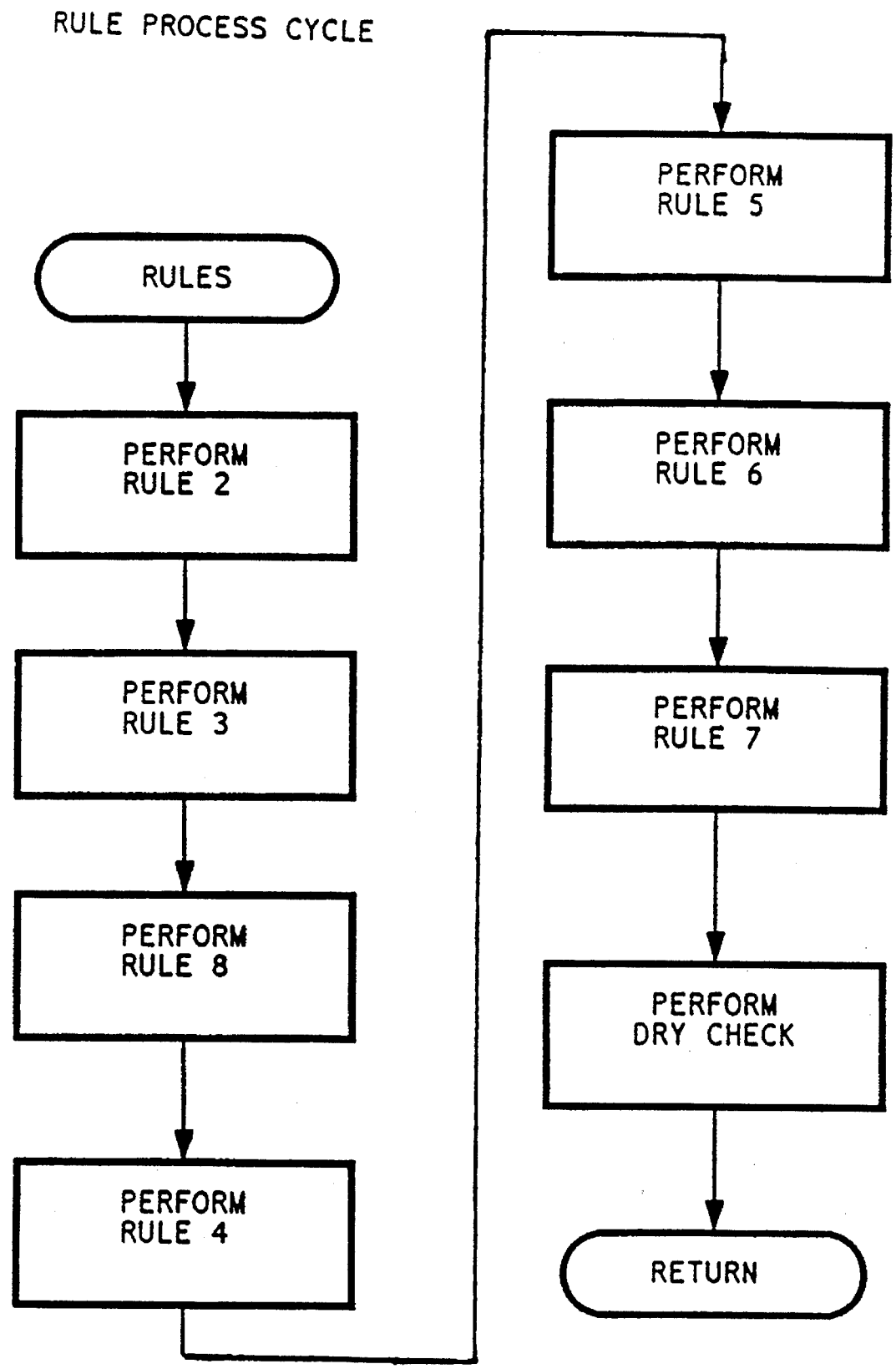
Figure 6I:
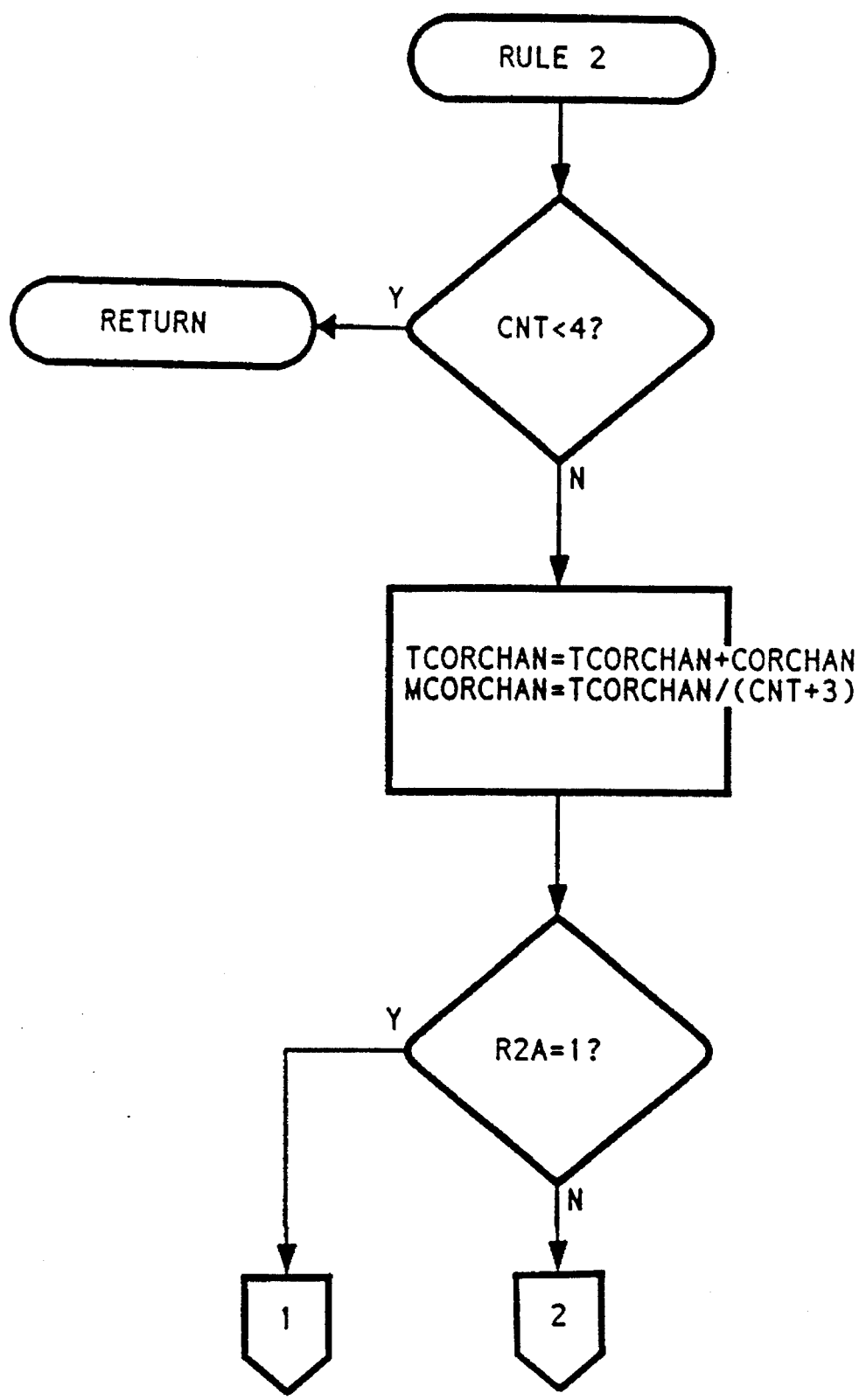
Figure 6J:
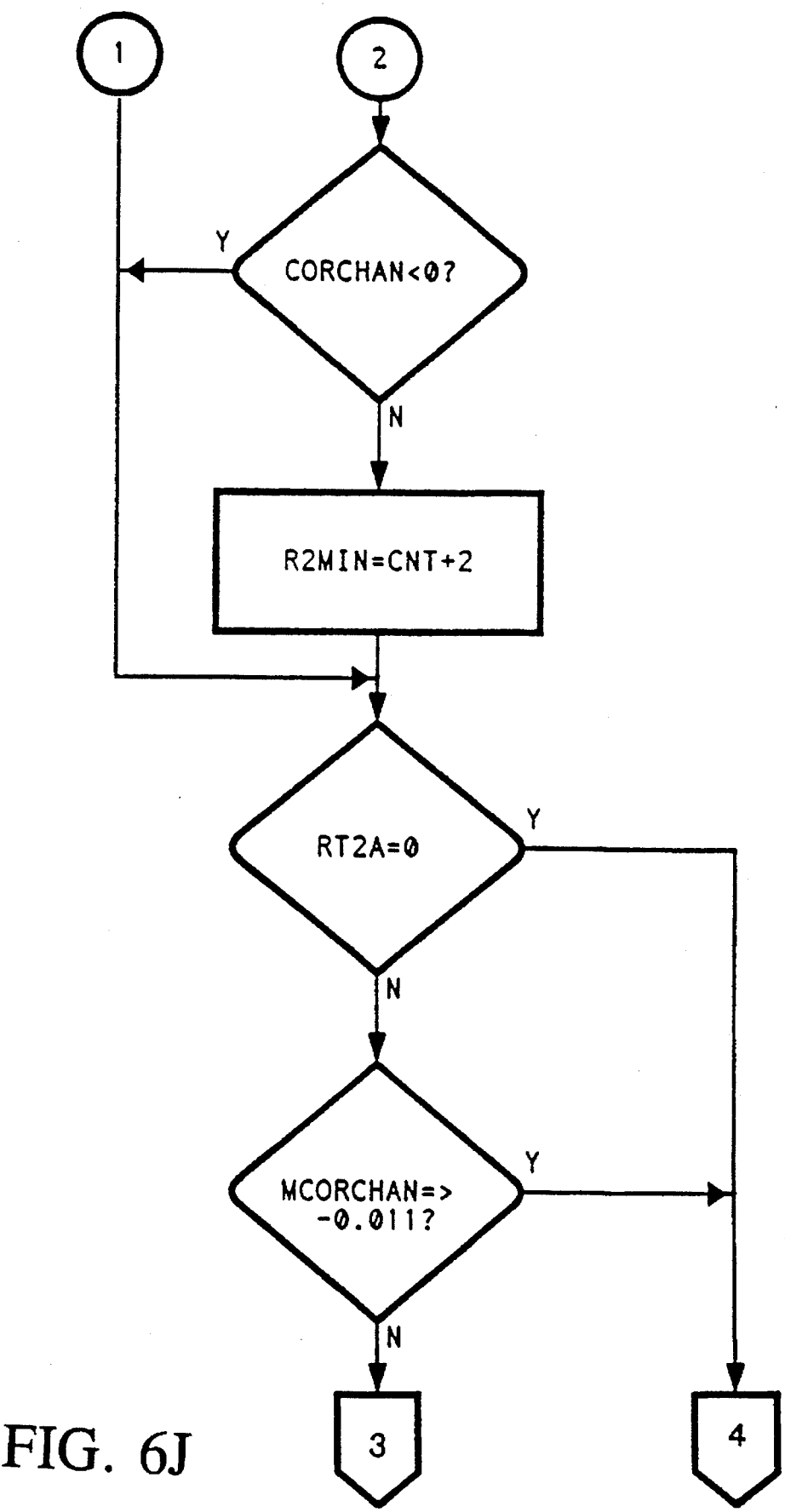
Figure 6K:
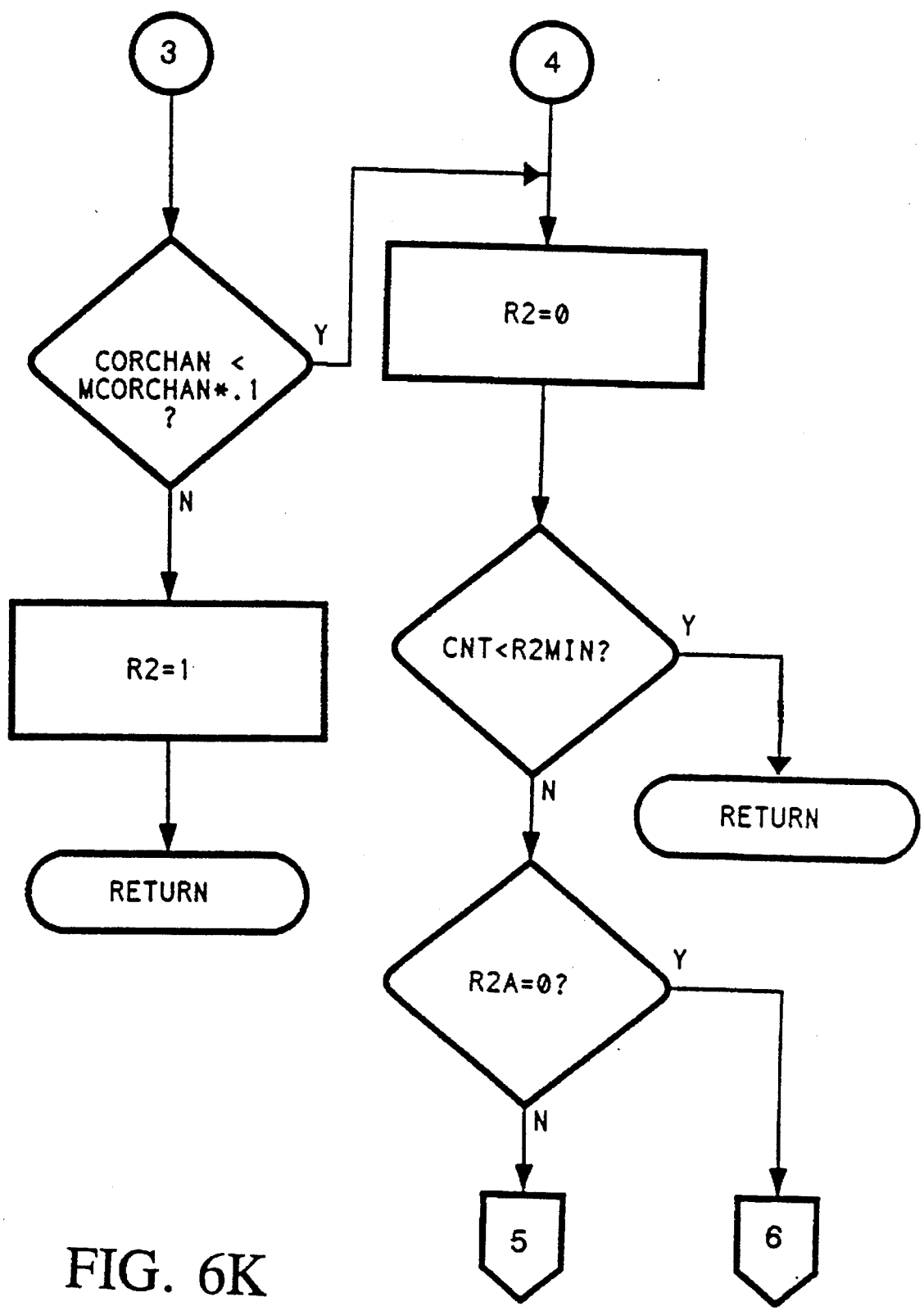
Figure 6L:
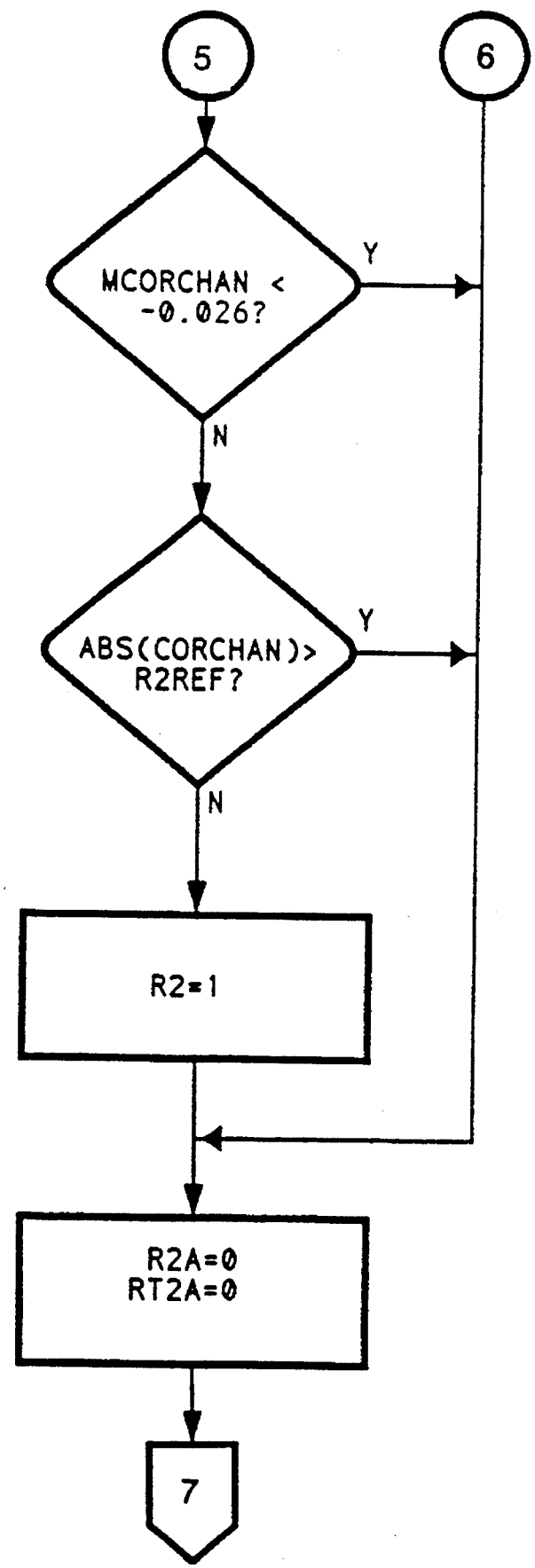
Figure 6M:
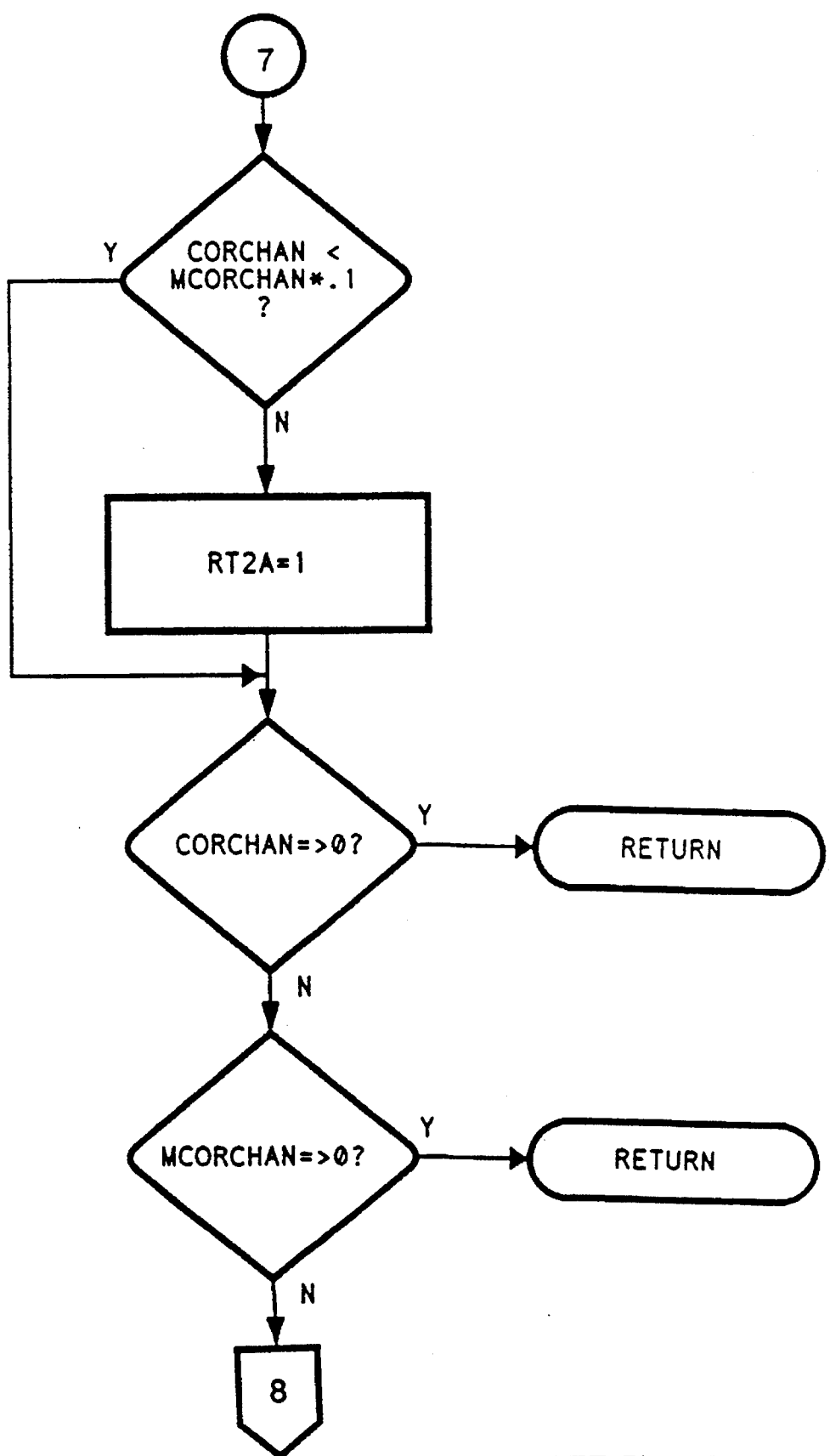
Figure 6N:
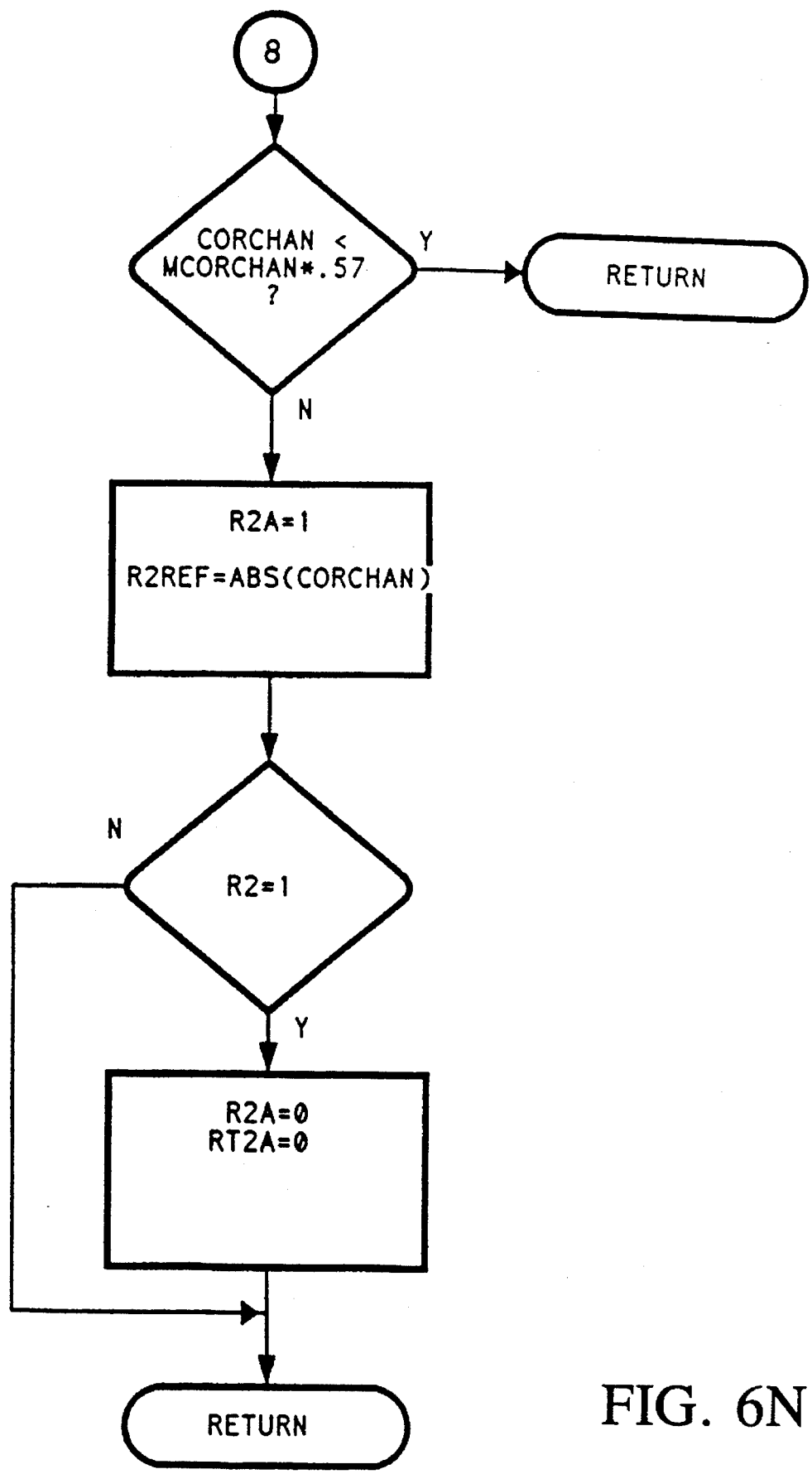
Figure 6P:
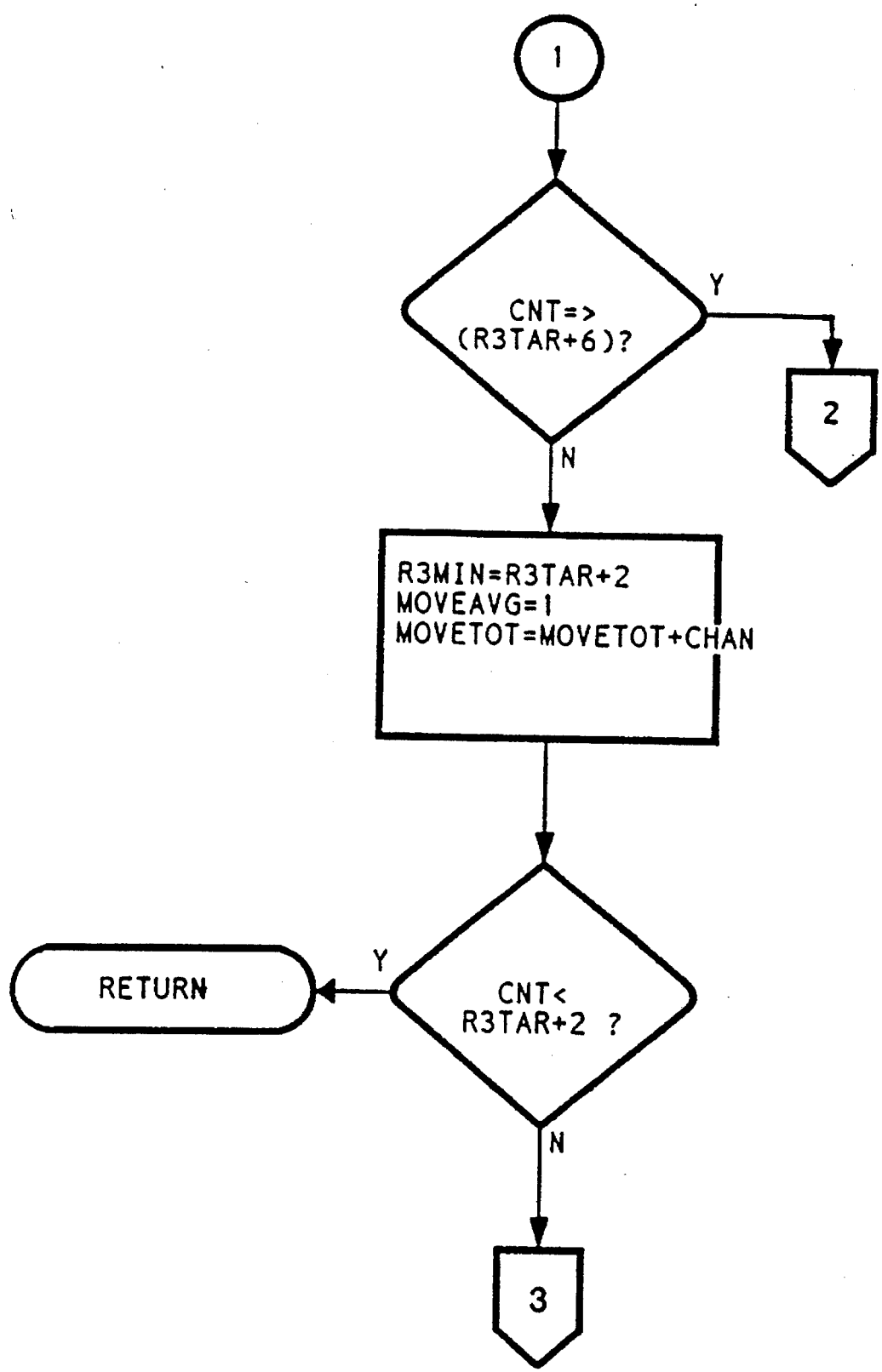
Figure 6Q:
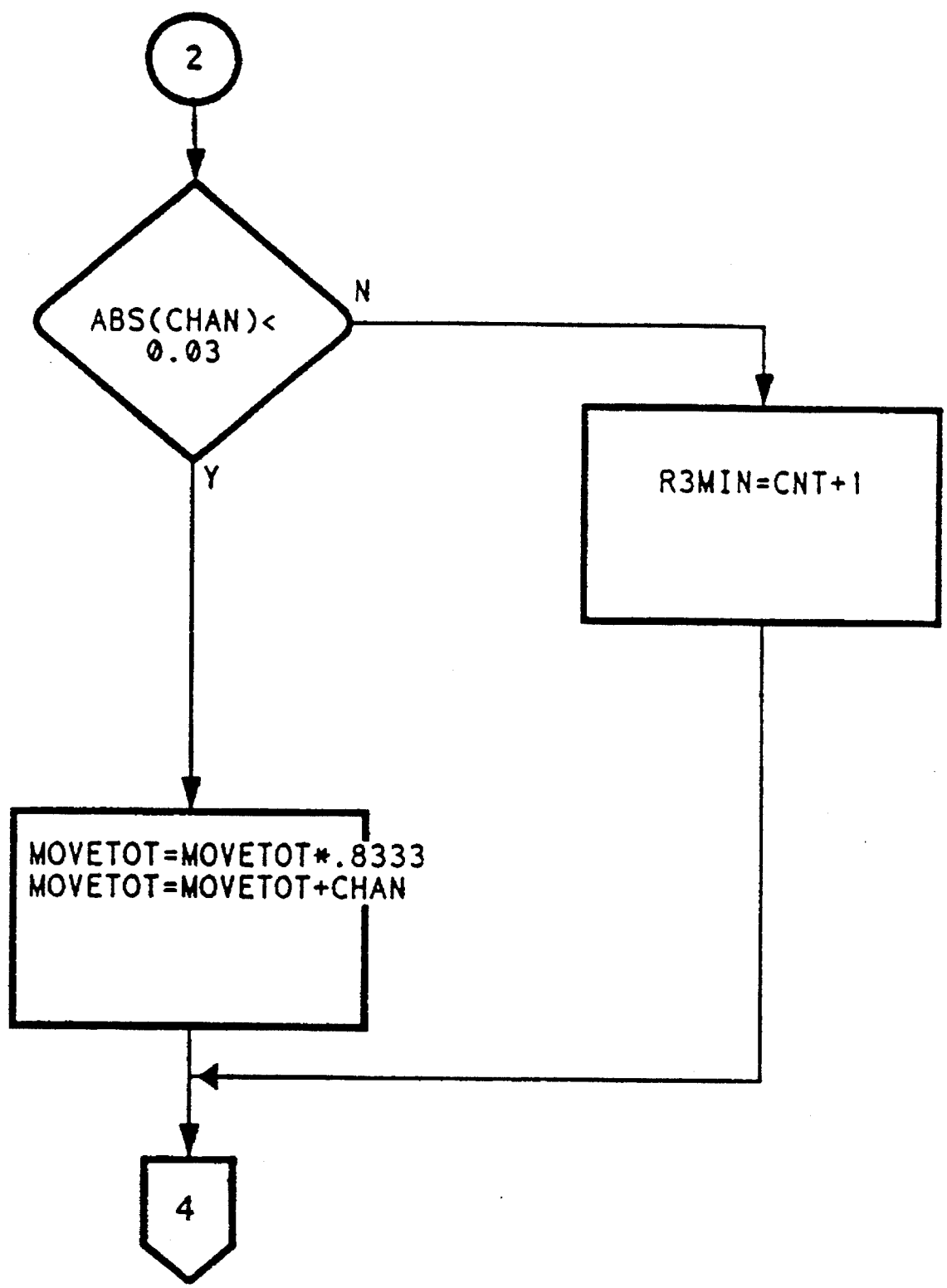
Figure 6R:
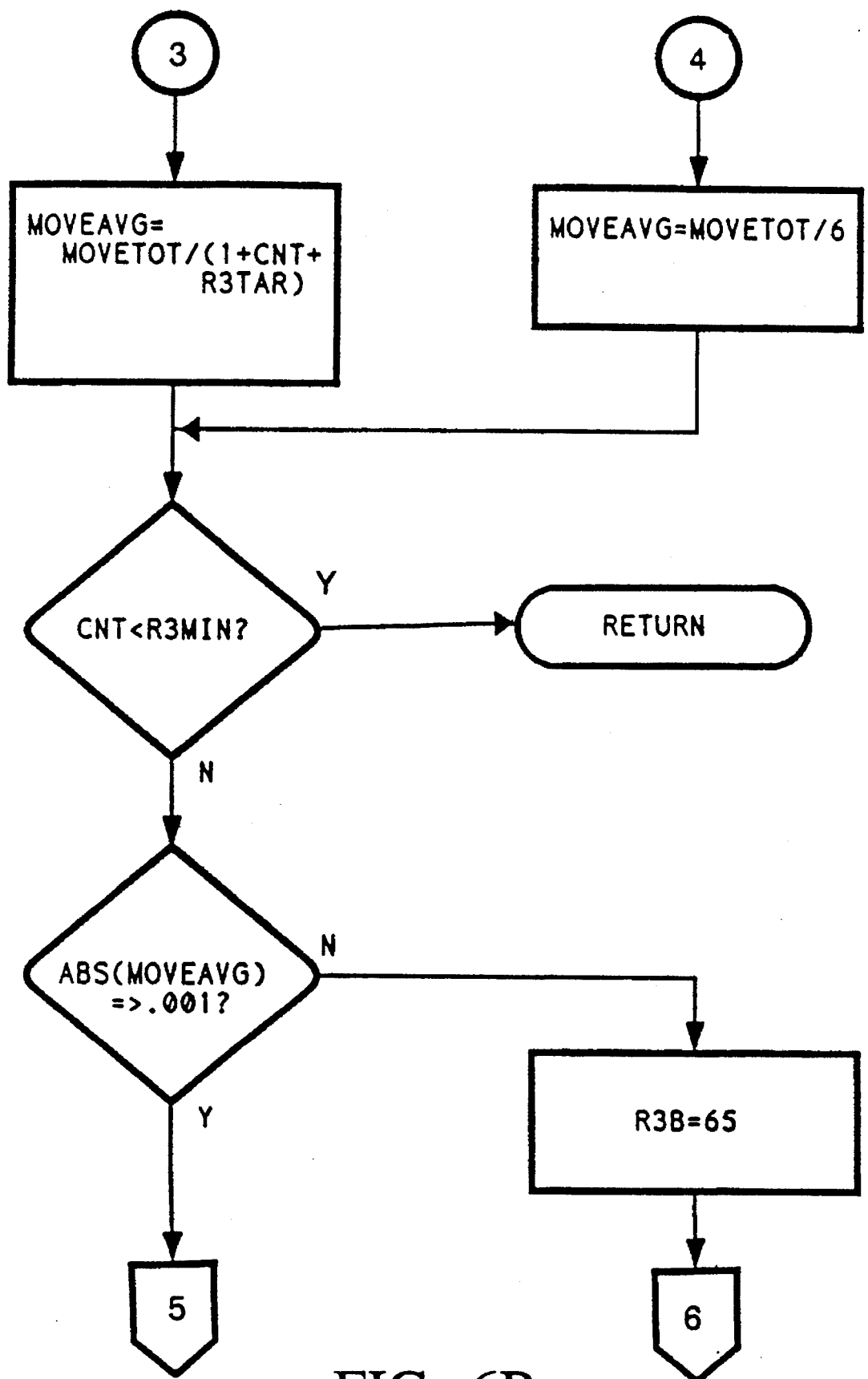
Figure 6S:
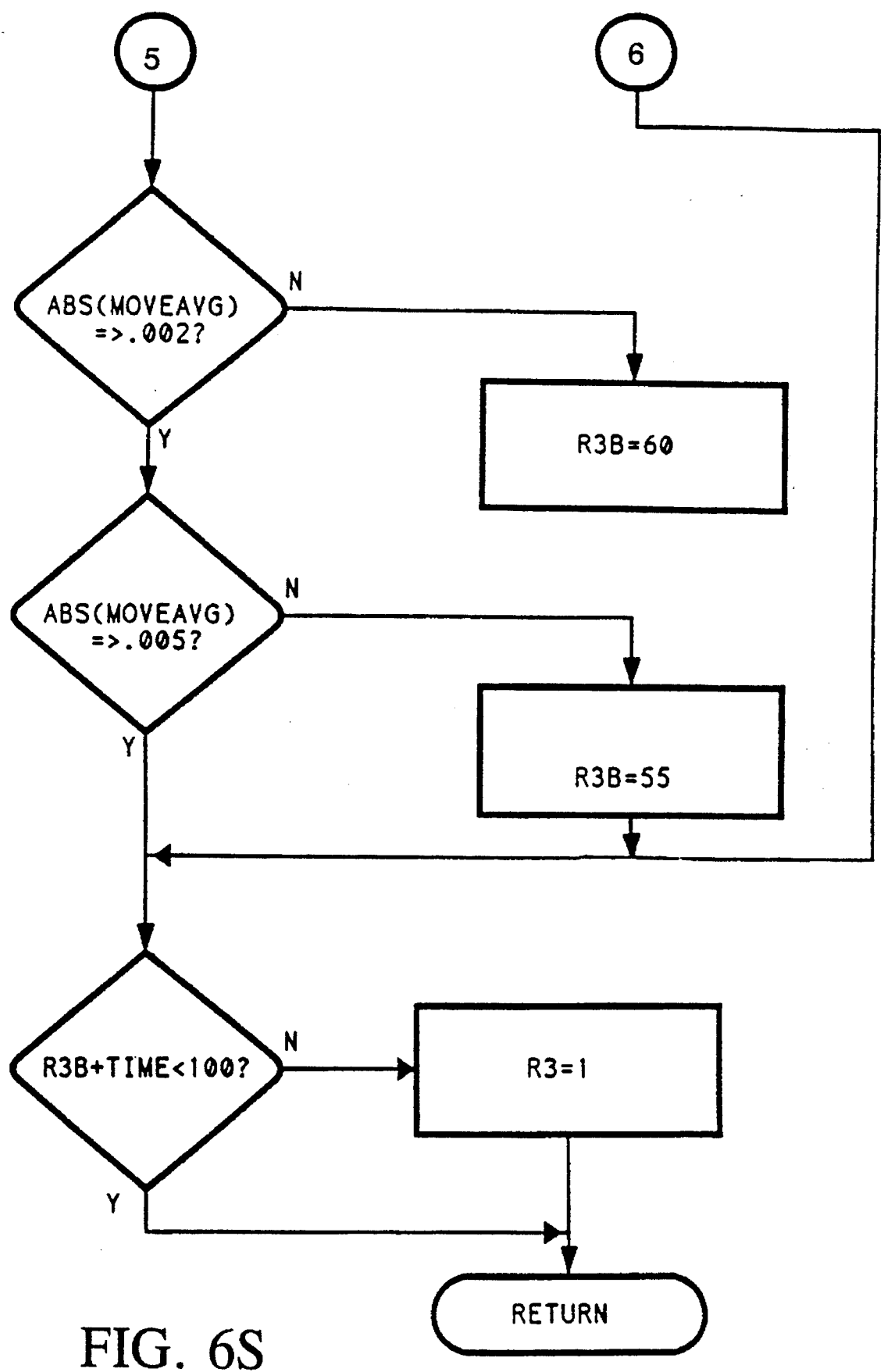
Figure 6T:
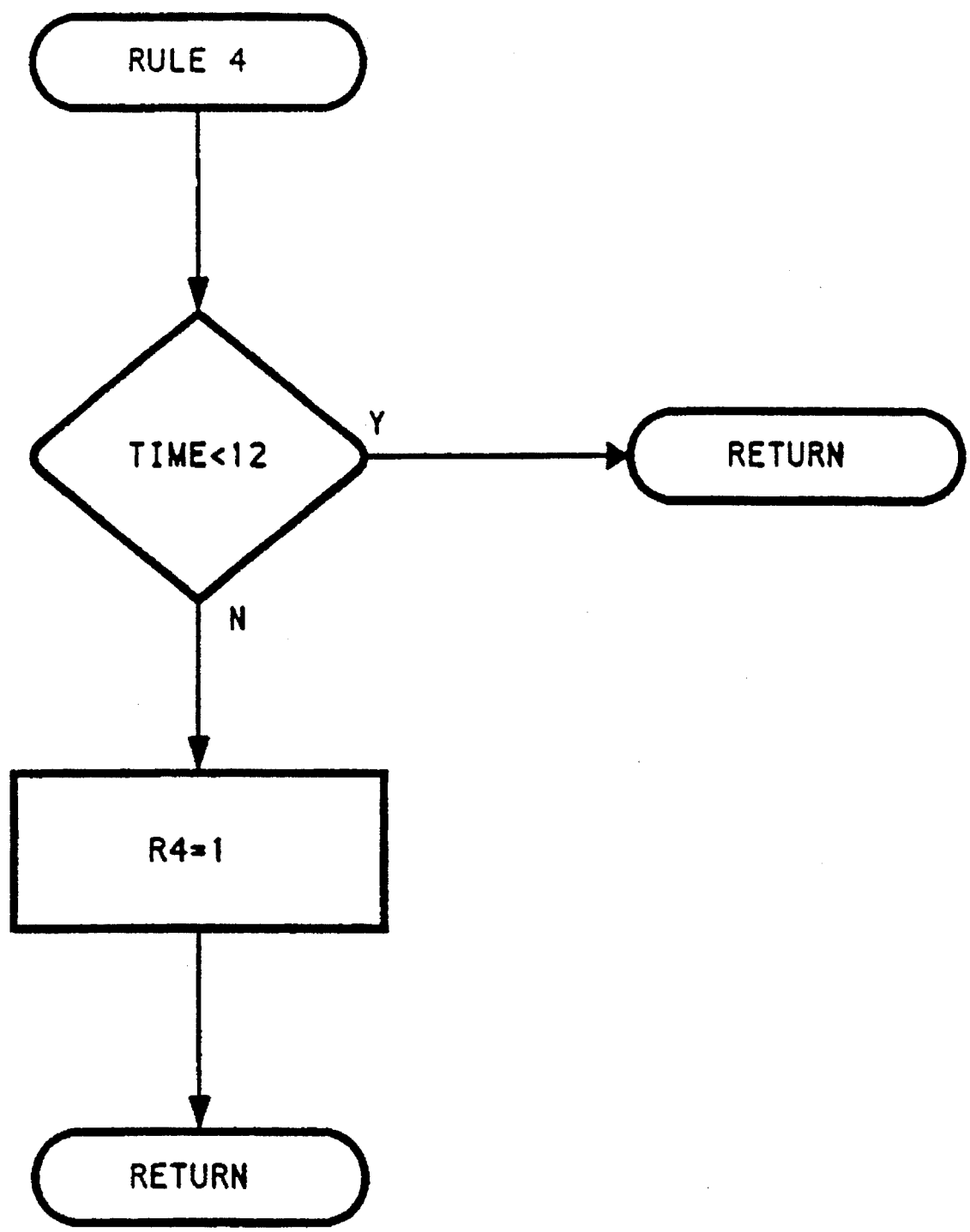
Figure 6U:
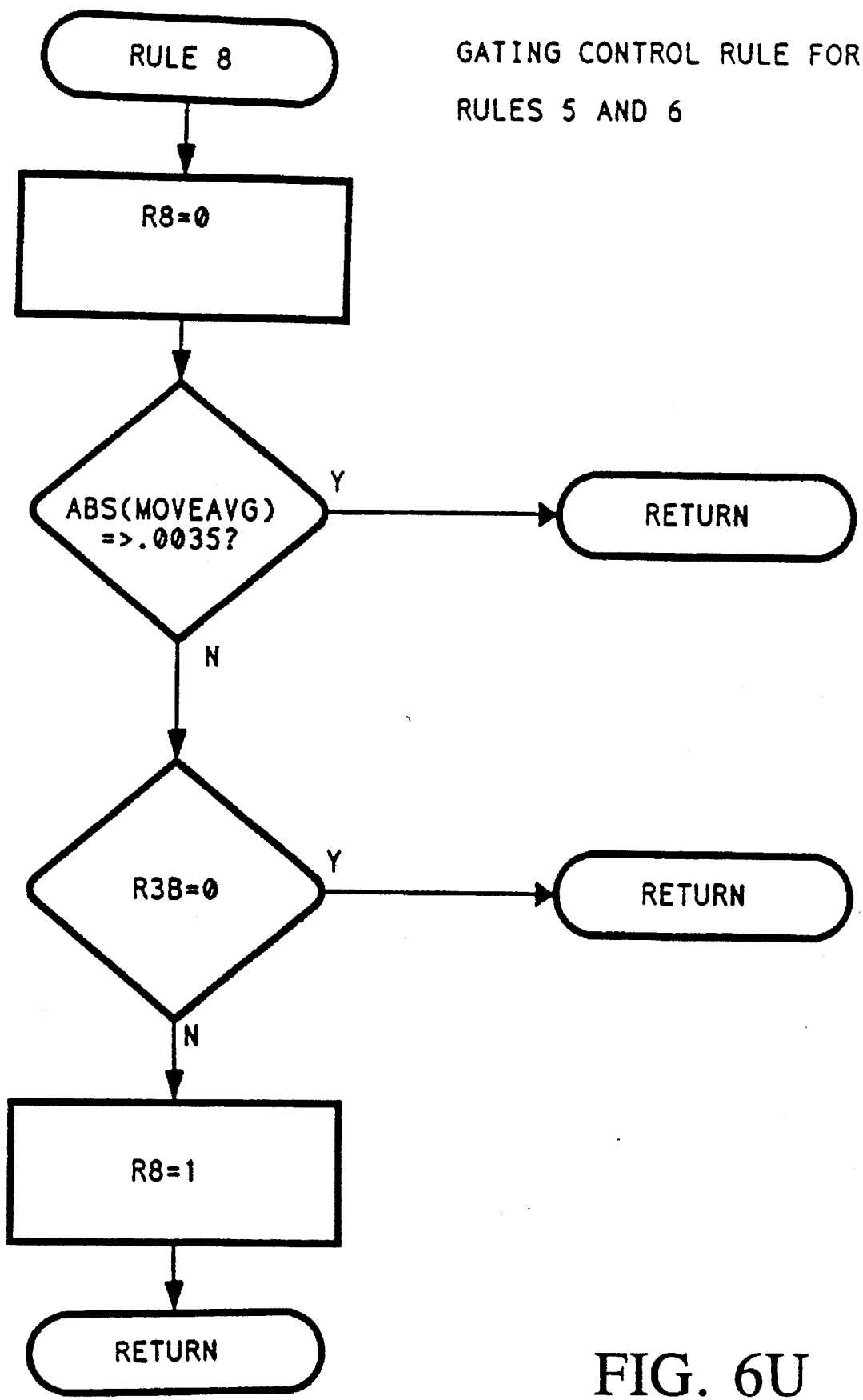
Figure 6V:
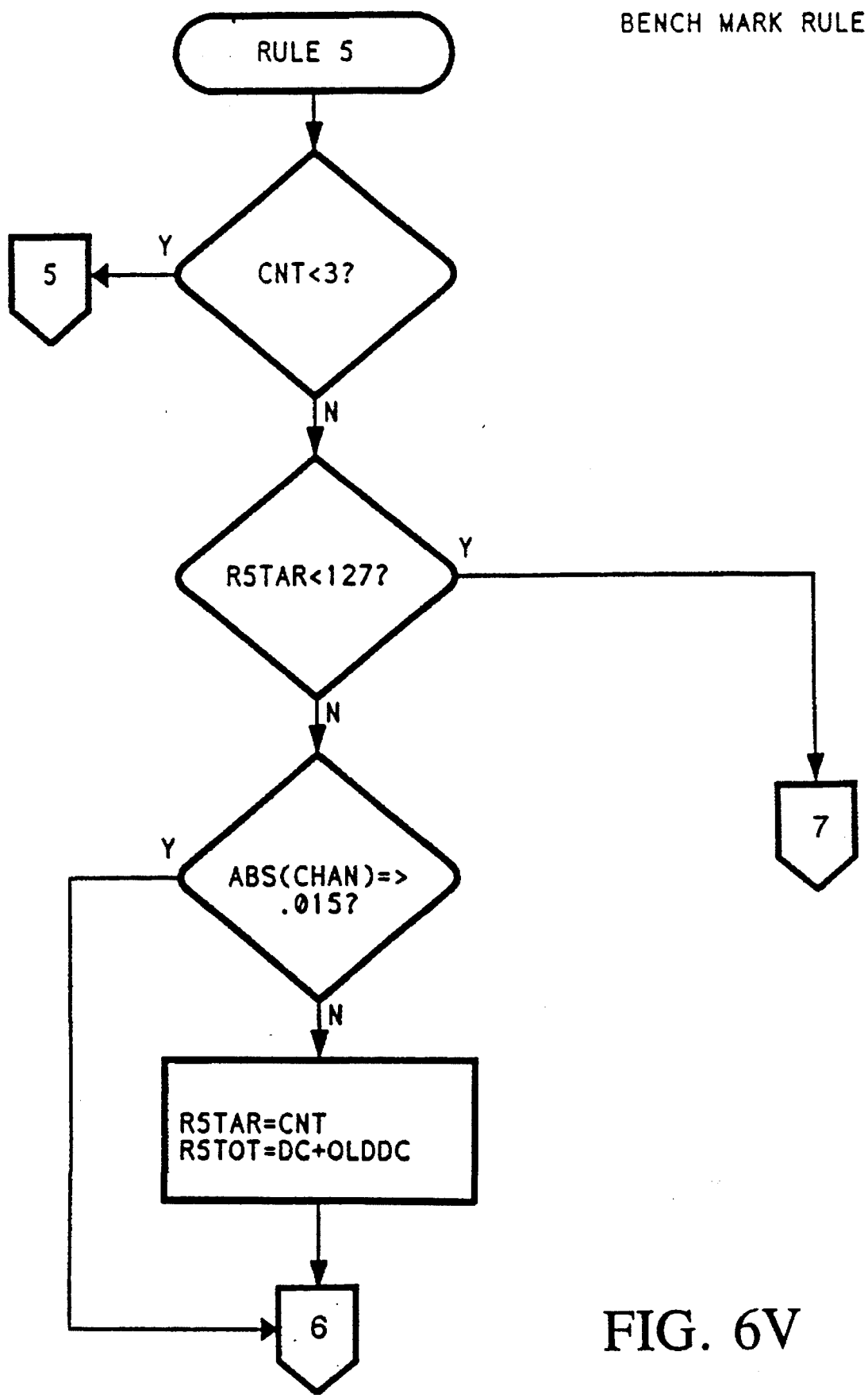
Figure 6W:
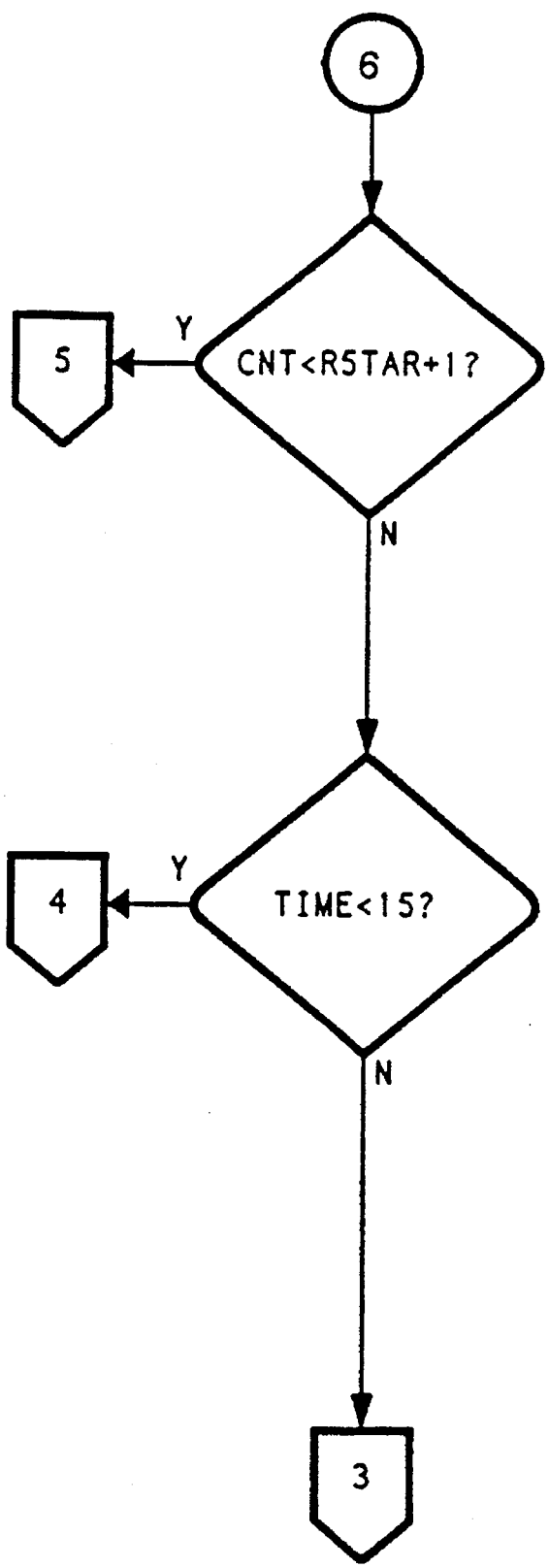
Figure 6X:
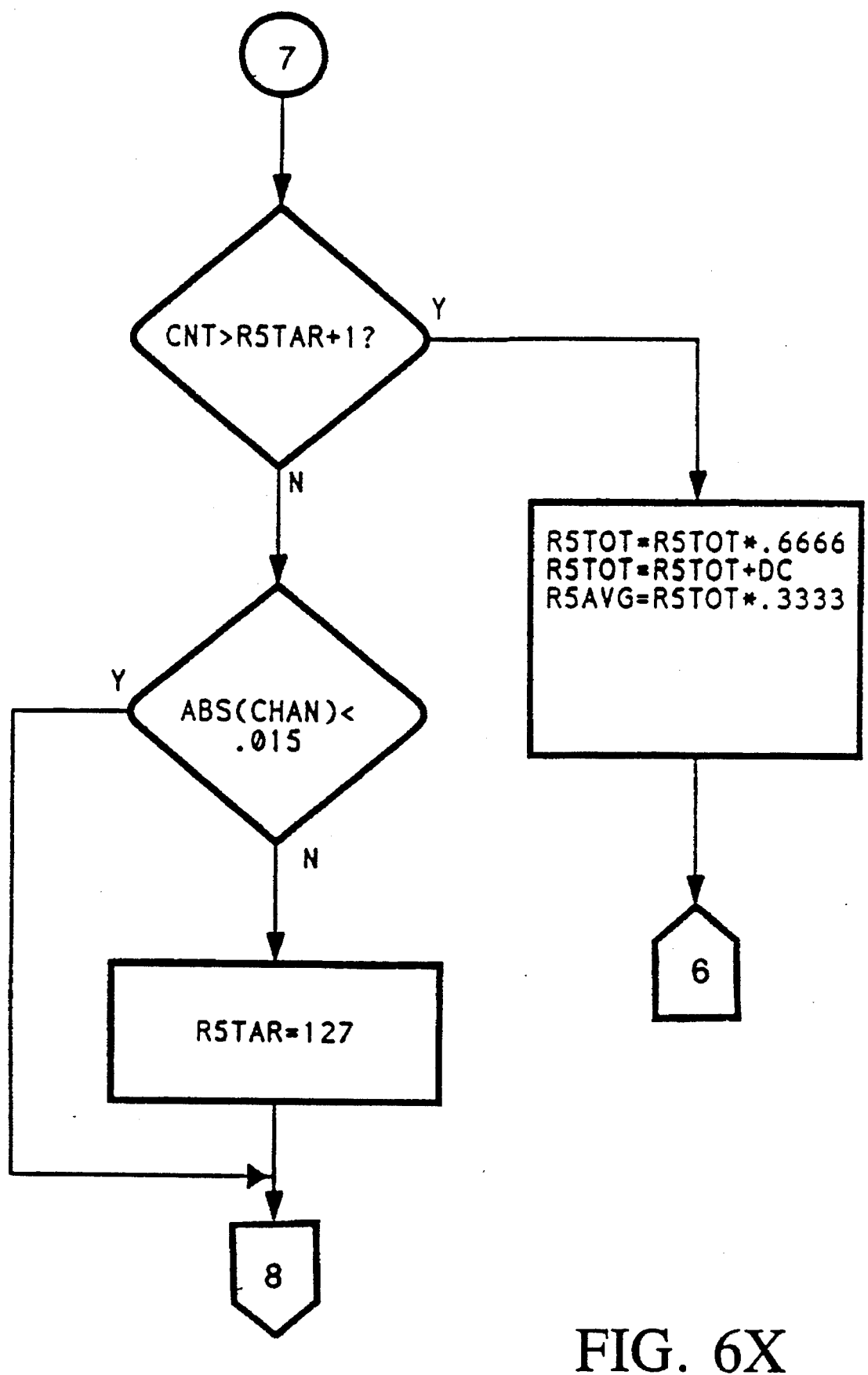
Figure 6Y:
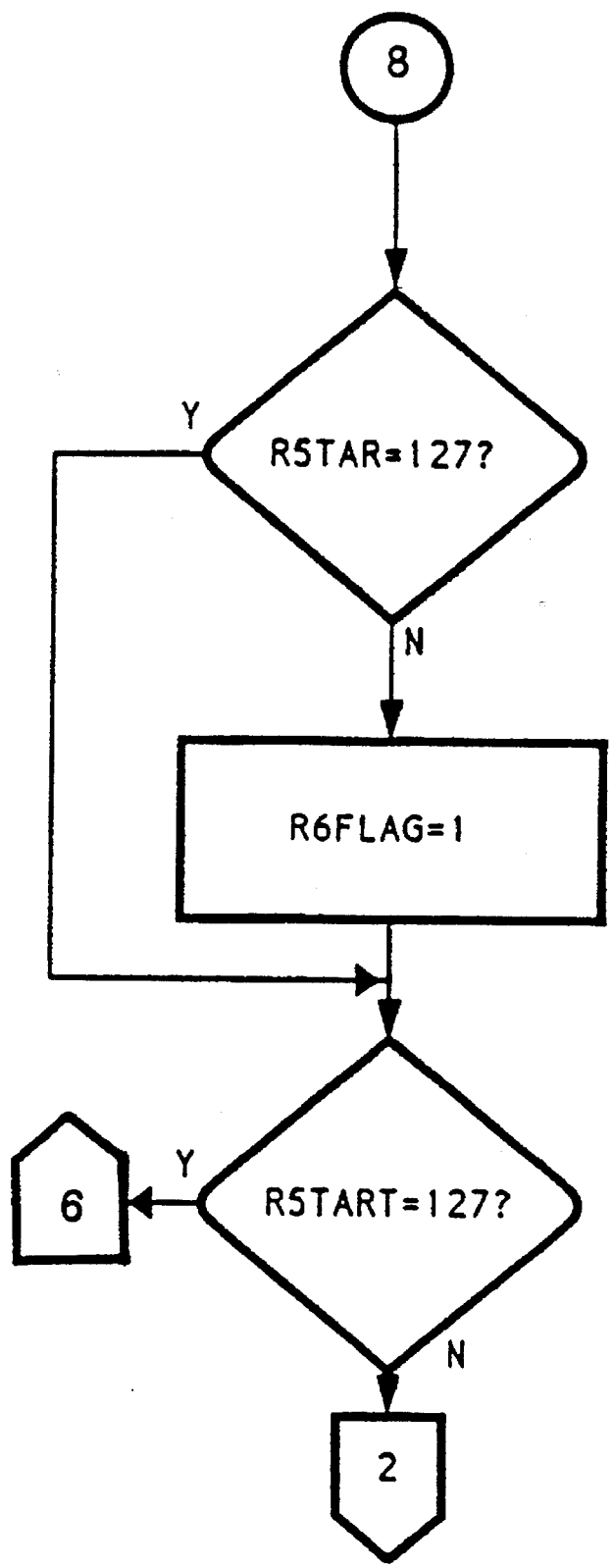
Figure 6Z:
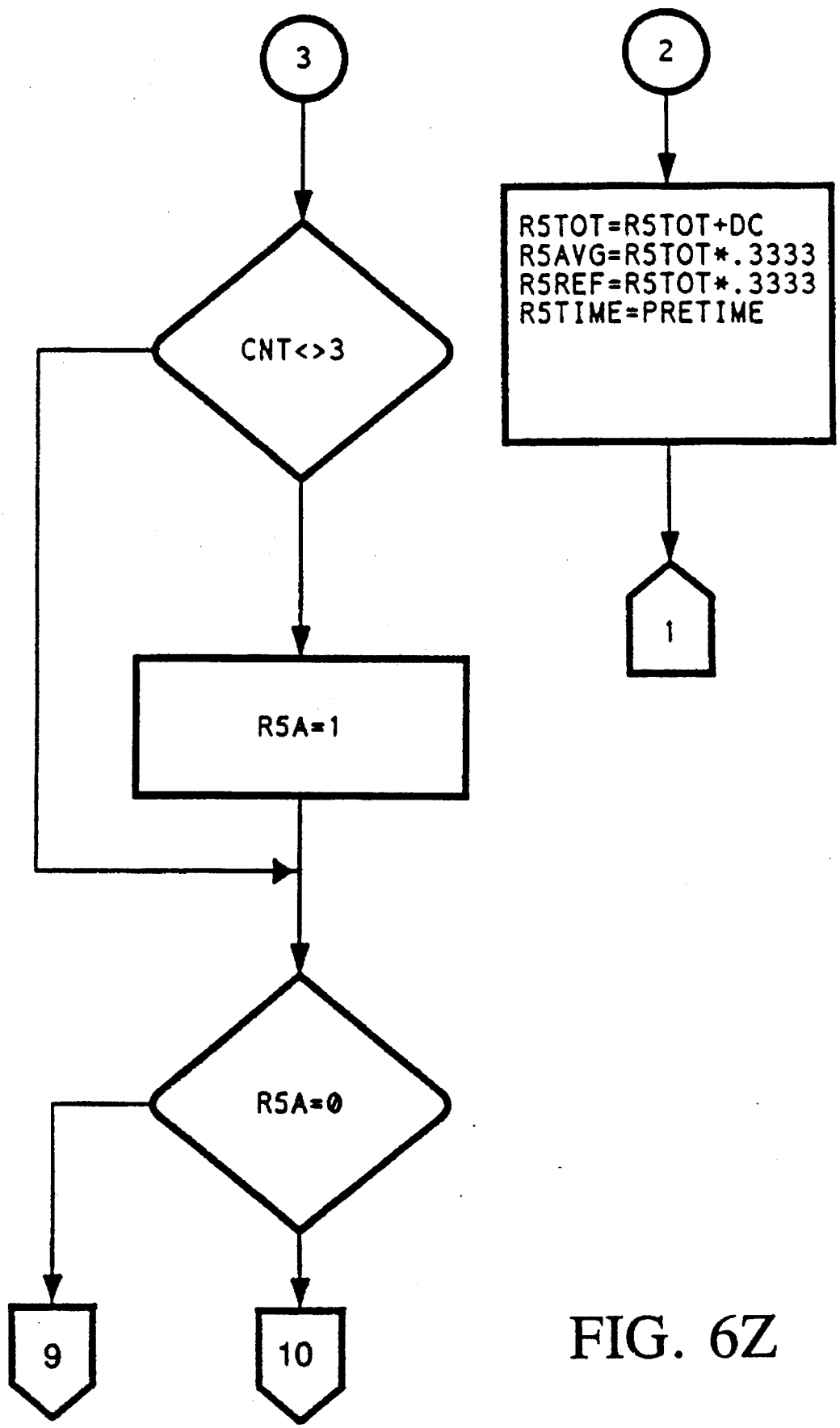
Figures 1, 6A:
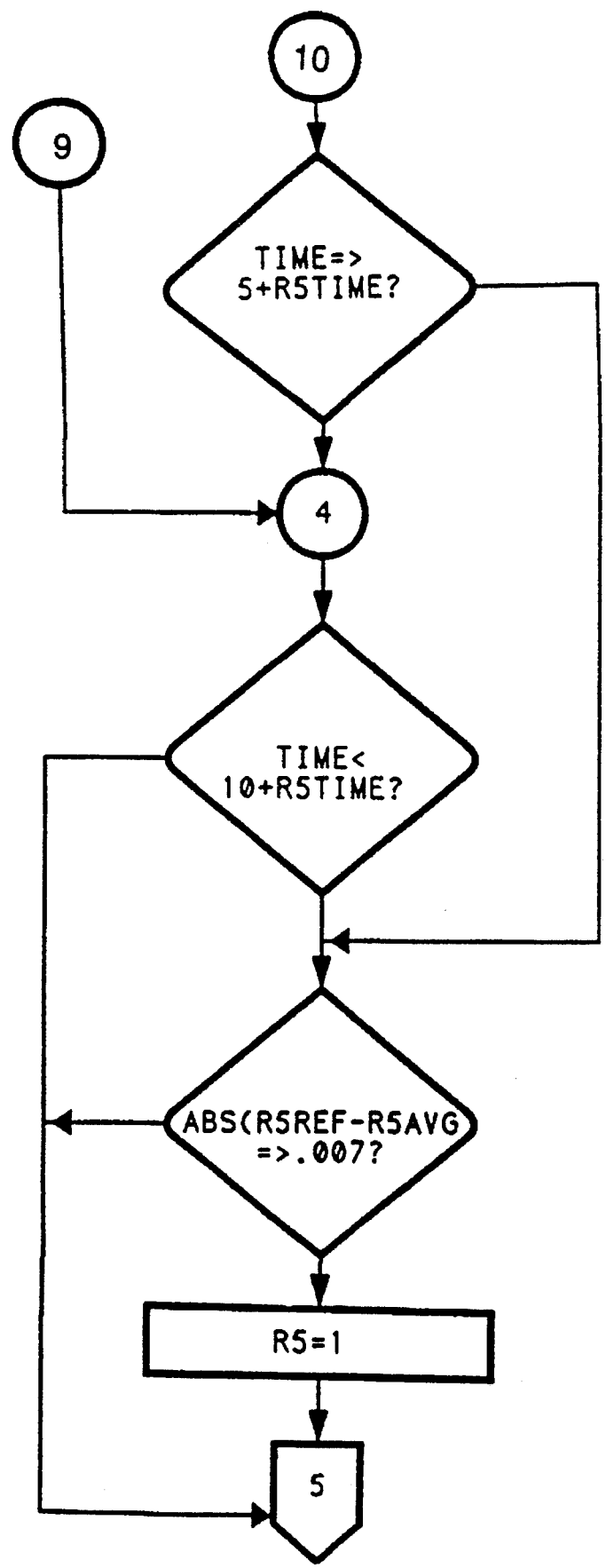
Figures 2, 6A:
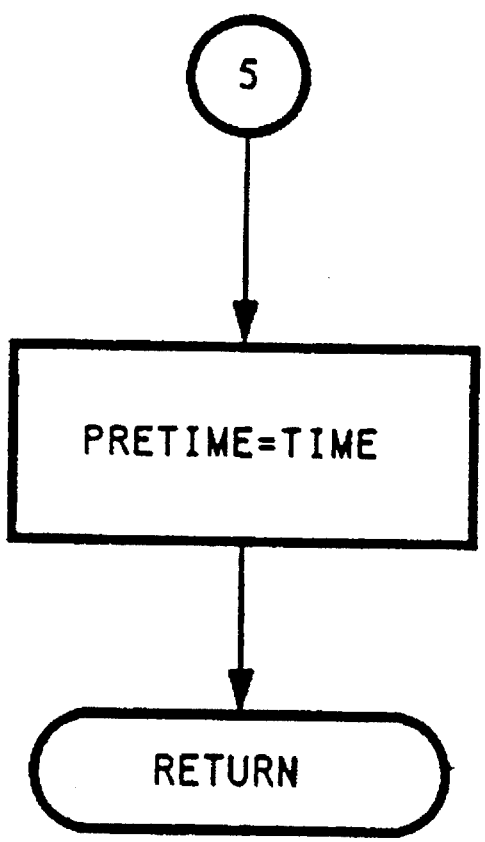
Figures 3, 6A:
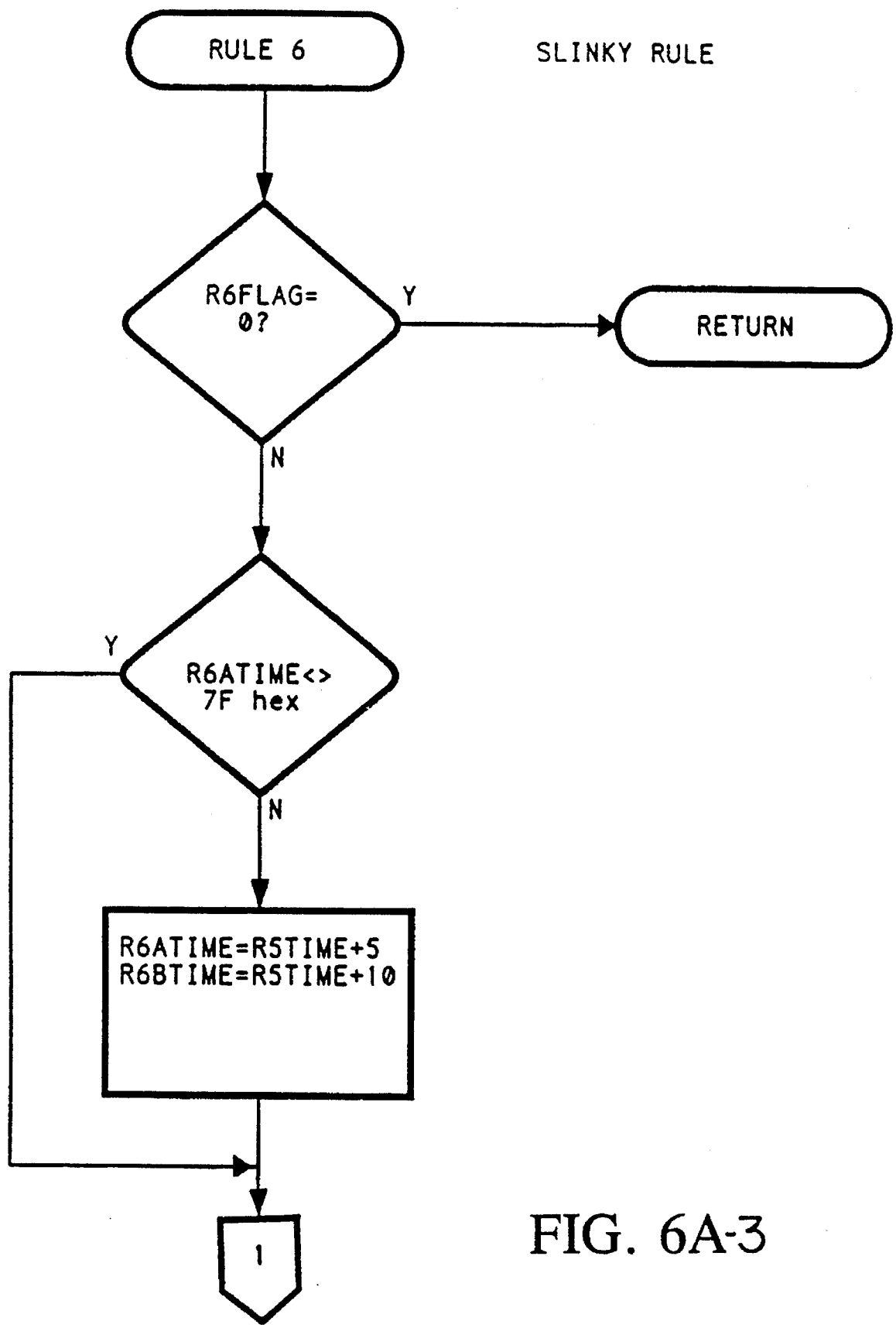
Figures 4, 6A:
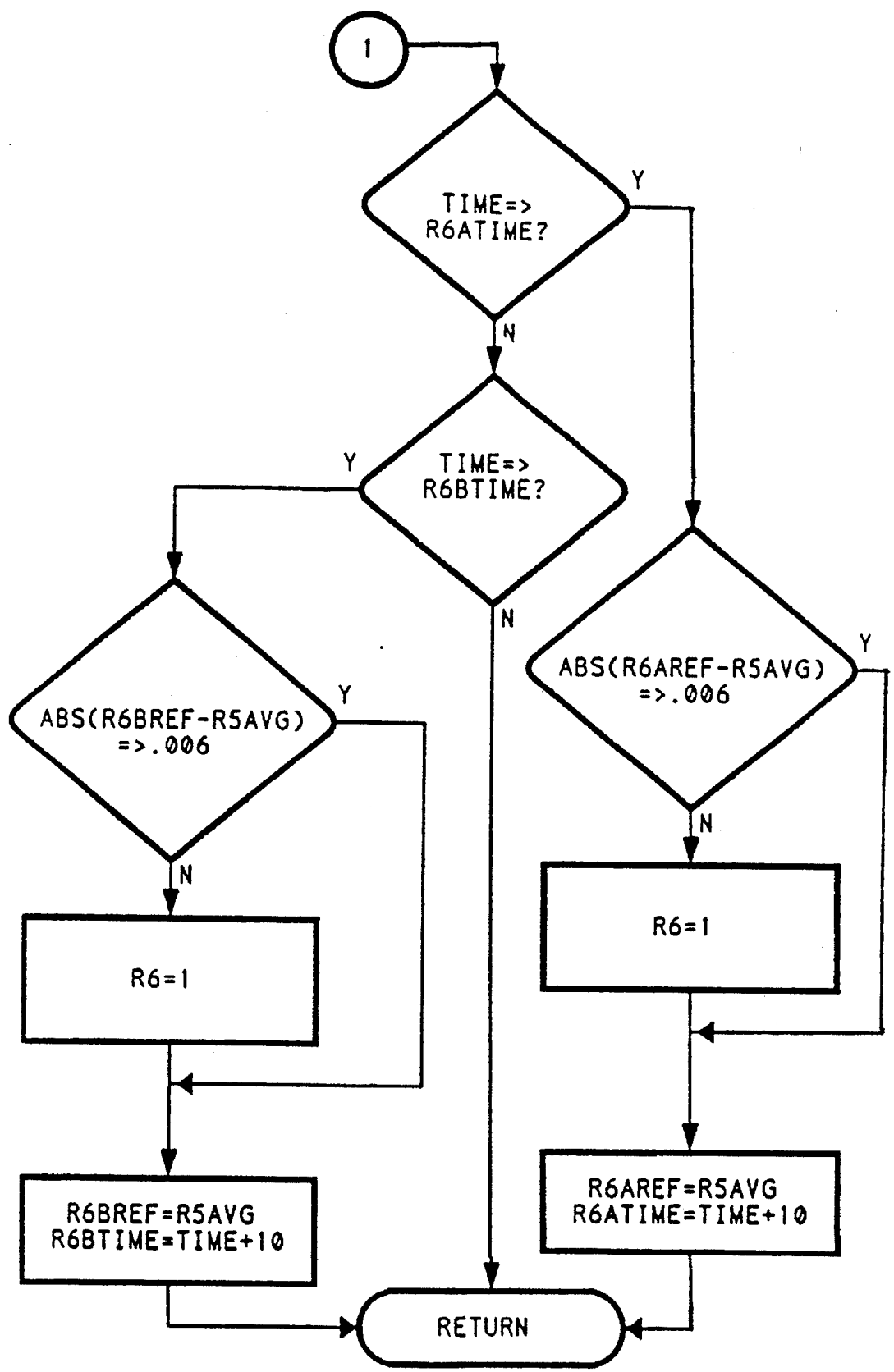
Figures 5, 6A:
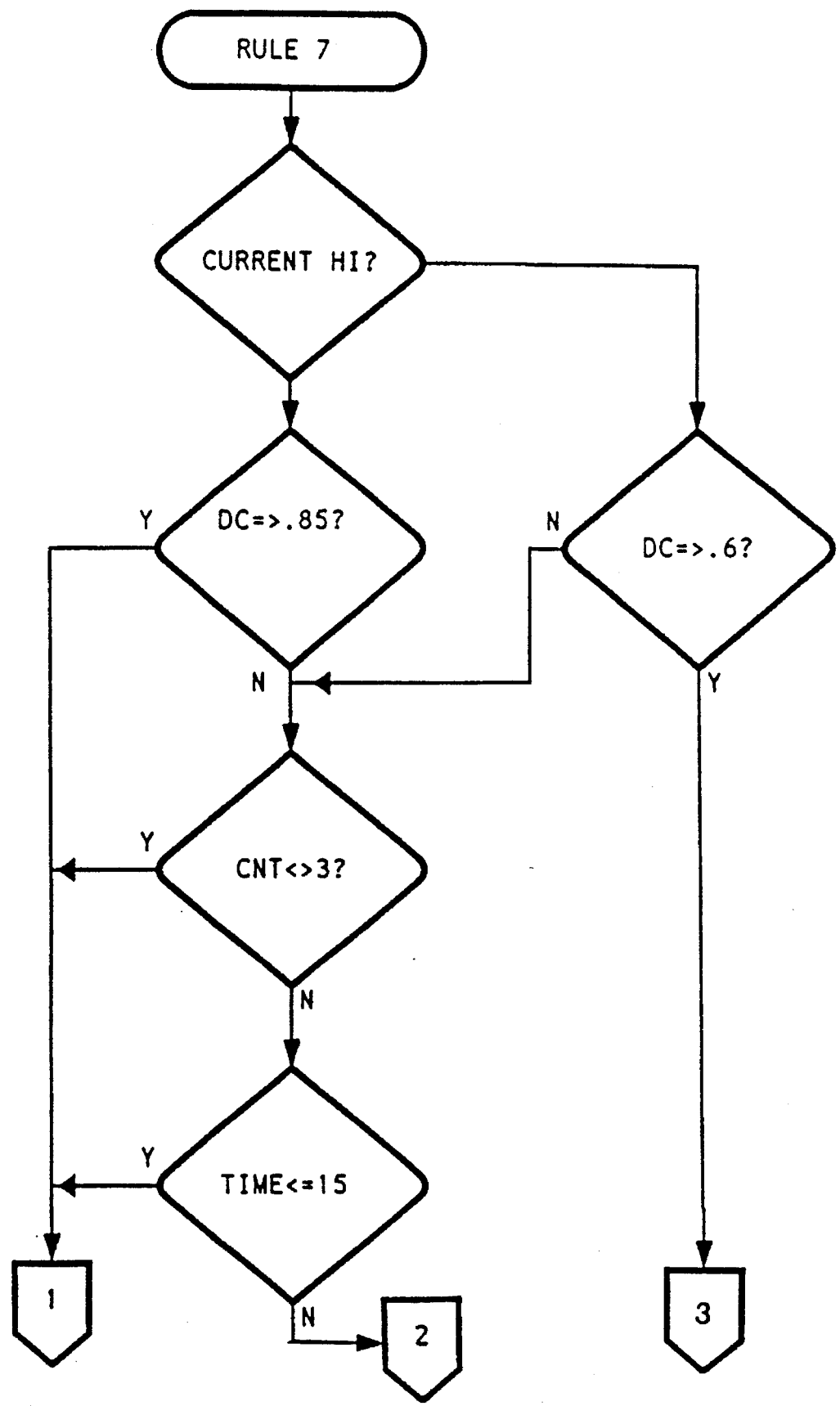
Figures 6, 6A:
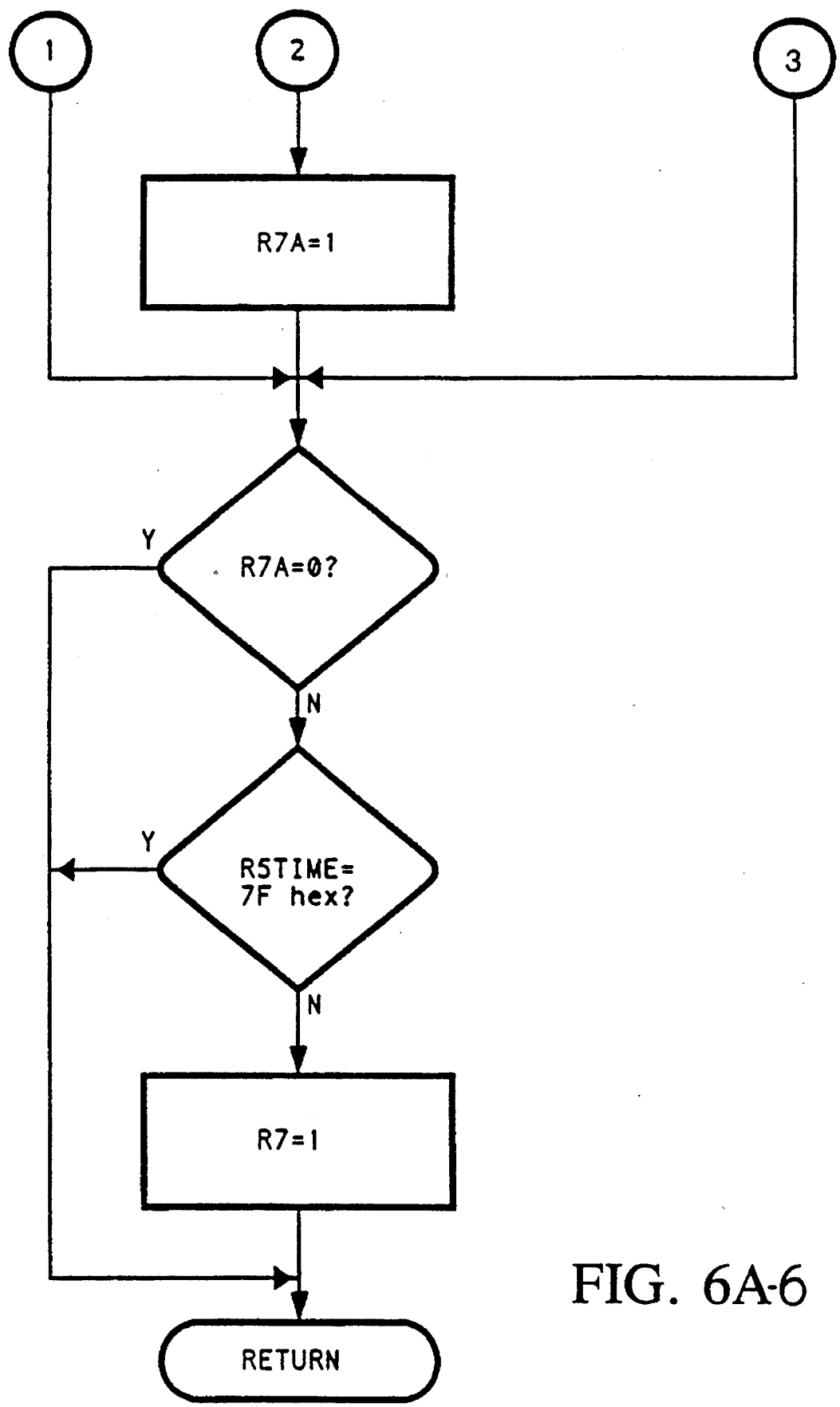
Figures 6, 6A, 7:
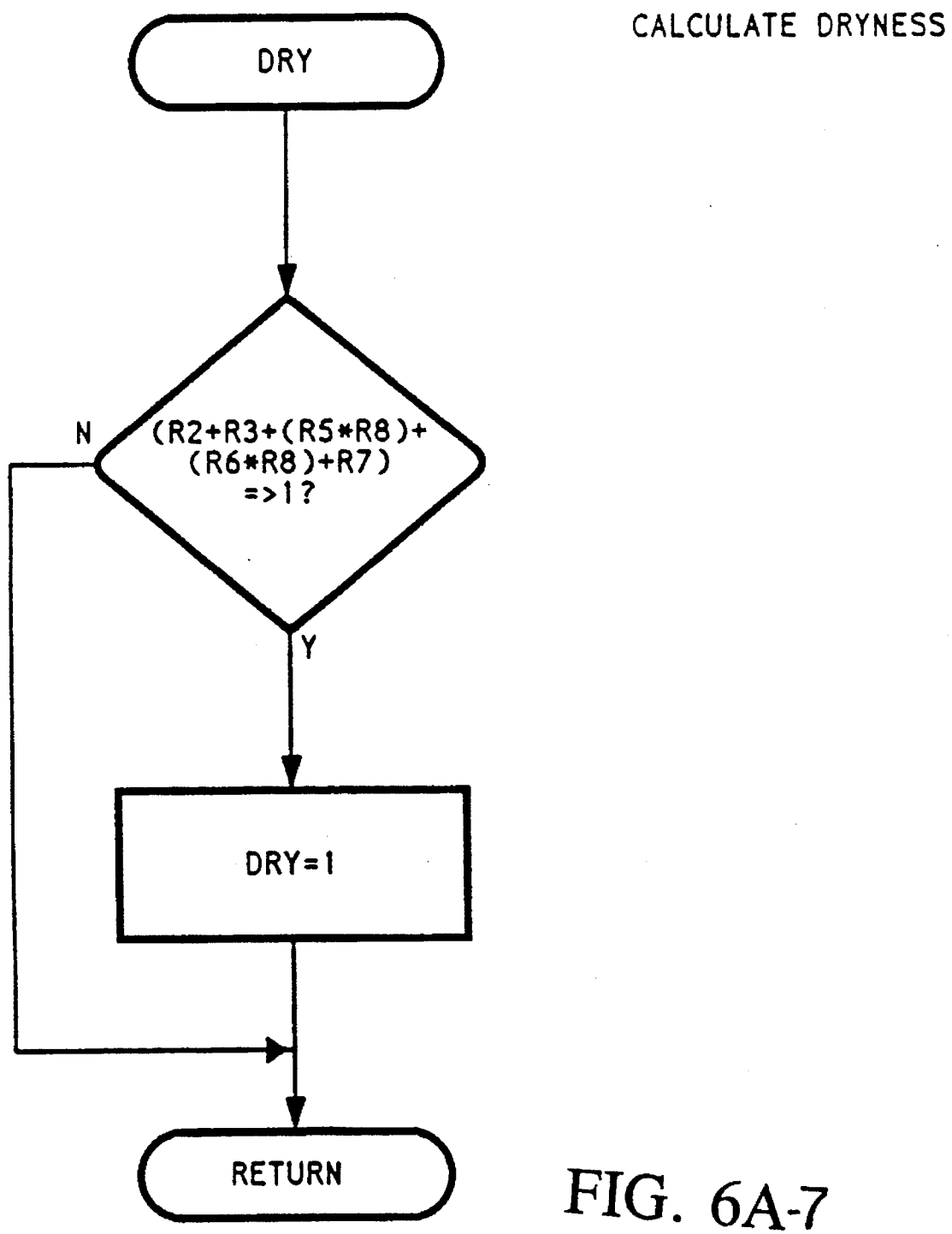

Attention is now directed to FIG. 6, which illustrates a curve fitting approach to determining the best termination time for the dryer cycle. The flow chart for the microcomputer is shown in twenty pans, A through T, on separate pages. On power-up (shown in pan A) when the unit is initially connected to the 220 V lines or after it has completed any one dryer cycle, the unit begins at "start" (1) and initializes all data collection parameters. In this state, the microcomputer continually monitors current to the dryer in a standby mode.

When the dryer is started by the operator, the current draw is sensed by the microcomputer and it enters a run mode, starting internal counters and timers. Using information from the current sensors, the microcomputer then monitors whether the heater is on, the power level that the heater is using, whether the motor only is on, or if the cycle has been terminated.

Attention is now directed to pan B of FIG. 6. While monitoring the dryer current, the microcomputer calculates the duty cycle or fraction of the time the heater is operating. Historical duty cycle information is maintained in temporary memory as the timer advances and the ON-OFF cycles of the dryer heater are monitored. The levels of the duty cycle are fitted to a curve and rule checks are performed using this information which assess the dryness of the laundry load. When the rules declare that the load is dry, the microprocessor waits until the heater begins an OFF pan of its ON-OFF cycle and sounds a beeper to warn of the future shut-off of the cycle.

Attention is now directed to pan C of FIG. 6. After a pan of the OFF cycle of the heater has passed, and the drum has partially cooled, termination is effected by the microcomputer at (4). The microcomputer activates at least one of the relays for a five second period, sufficient to stop the motor and the rotation of the dryer drum.

Sensing the ON-OFF heating cycle gives the microcomputer the capability to delay termination until close to the end of a "HEATER OFF" phase of the operation, rather than elsewhere in the cycle. In this way, the load to be dried receives the benefit of the "free" heat in the dryer, before the thermostat can restart the heater. Shutting off the dryer during the "HEATER OFF" phase also reduces wear on the relay, since the current being switched is reduced.

Attention is now directed to the following pans of FIG. 6, which provide a detailed flow chart showing a possible curve fitting procedure and set of rules for the operation of this invention. Pan D of FIG. 6 provides a list of variables that the microprocessor may use in the following pans of FIG. 6. Parts E and F provide the details of the curve fitter routine. Pan G outlines the rule process cycle.

The balance of the parts of FIG. 6 illustrate the details of the rules used, and the means of decision that the load is dry. Parts H, I and J outline the procedure of Rule 2 (there is no Rule 1). Parts K and L illustrate the procedure of Rule 3. Part M illustrates the procedure of Rule 4. Part N illustrates the procedure for Rule 8, which is an enabling rule for Rules 5 and 6 (following). Parts O, P, and Q illustrate the procedure for Rule 5. Part R illustrates the procedure for Rule 6. Part S illustrates the procedure for Rule 7, and Part T illustrates the method of applying the rules to determine whether the load is dry. When DRY=1, the microprocessor enables the shut-down procedure.

The procedure described by FIG. 6 illustrates a curve fitting approach to the correlation between the pattern of power demand and the laundry moisture condition. Other curve fitting procedures and rules, not described here, may serve equally well in facilitating the operation of the invention.

It is also recognized that while it may be possible to introduce improvements in the accuracies of the methods described in these figures, they nevertheless serve as basic illustrations of the concept, means, and method of this invention.

In addition to the curve fitting method described in FIG. 6, numerical or statistical approaches may be used to provide the correlations required.

DESCRIPTION OF NUMERICAL METHOD

The following paragraphs provide a description of a model that was used to obtain a numerical predictor for the time to dryness. The model is based on the information in the times of the ON and OFF cycles of the dryer heater, taken from a large number of actual dryer data files. Once dryers reach their operating temperature, the heater often oscillates ON and OFF, maintaining the drum and exit air temperature of the dryer within a fixed range or band.

The variable to be predicted was called AONT, which is the accumulated ON time for the dryer heater until the desired level of laundry dryness is reached. The raw data was obtained from monitoring the operation of different dryers under different conditions and continuously measuring load moisture by electronic weighing of the operating dryer. The point of dryness, AONT, was the point at which the laundry felt dry to the touch. Note that the actual moisture content at this "dry" point varied somewhat, according to the type of fabric used.

If dryness occurred when the heater was ON, then AONT included the time to when the heater shut off at the end of the particular ON-OFF heater cycle it was operating in. If dryness occurred when the heater was OFF, then AONT was the accumulated time up to when the heater shut OFF in the previous ON-OFF cycle.

Two analyses were performed using this numerical method. In both cases, information from the first part of the drying cycle was used to predict when dryness occurs. The first analysis was based on the first 10 minutes of time, or the first 3 ON-OFF heater cycles, whichever took longer. For the i-th heater cycle in this period, the difference $D(i)$=(on-time)−(off-time) was computed. The mean IYB1 of these differences was then computed. Then a straight line IB1+(SLB1)t was fit to the points $(t_1, D(i))$, where $t_1$ is the total time from 0 until the beginning of the i-th cycle. Hence IB1 is the intercept of this line and SLB1 is the slope. Also the $D(i)$ were transformed to $Y_i=\log(D(i)-\min\{D(i)\}+1)$ and then a second straight line LI1+(LSL1)t was fit to the points $(t_i, Y_i)$. Hence LI1 is the intercept of this second line and LSL1 is the slope. Several other variables were also created, namely LI1S=LI1*LI1, IB1S=IB1*IB1, and IBSLB1=IB1*SLB1. This produced eight predictor variables {IYB1, IB1, SLB1, LI1, LSL1, IBSLB1, LI1S and IB1S} that were then used as a basis for predicting AONT, using the input of the times of the heater ON-OFF cycles.

The next step in the analysis was to construct a discriminator that assigned a load of laundry to one of two groups; namely Group 0={delicates, permanent press} and Group 1 containing the remaining types of loads. The discriminator was constructed by first fitting an equation $Y=\beta_0+\Sigma_{i=1}^{7}\beta_i x_i$ to the files where $Y=0$ if the load was in Group 0, and $Y=1$ otherwise. The $x_i$ were 7 of the predictor variables described in the previous paragraph. The variable LSL1 was not used. A stepwise regression analysis was then carried out to determine a "best" subset of the predictors for predicting Y. This led to using the variables {IYB1, LI1, SLB1, IB1, IBSLB1} in the discriminator and dropping the others {LI1S and IB1S}. From this, the numerical values of the $\beta_i$ were obtained and these values together with the values of the $x_i$ for a new load were used to assign the load to one of the two groups, 0 or 1.

A predictor was then constructed for each group of first fitting the equation $AONT=\beta_0+\Sigma_{i=1}^{7}\beta_i x_i$ where the 7 predictor variables described above (again not including LSL1). A stepwise regression analysis was then carried out that led to using the three variables (LI1S, LI1, IBSLB1) for prediction with Group 0 and the two variables {IYB1, LI1S} for prediction with Group 1. Hence the groups are indeed different. This model does an excellent job of prediction as the $R^2$ between the predicted values of AONT and the actual values of AONT was 95% on a diverse sample of 108 dryer data files.

As a second step in the development of this method, the analysis was continued to include the next 10 minutes of time beyond the time limit of the first predictor. More variables were added by fitting a line IB2+(SLB2)t to the $(t_i, D(i))$ and a line LI2+(LSL2)t to the $(t_i, Y_i)$ for the period. The variables LI2 and LIL2 were then transformed to $LI2=LI1-LI2$ and $LSL2=LSL1-LSL2$. A new derived variable was also added; namely IBSLB2=IB2*SLB2. The data used for fitting these new variables did not include those files that had already been terminated during this period by the first predictor. The equation $AONT=\beta_0+\Sigma_{i=1}^{7}\beta_i x_i$ was then fit using stepwise regression where the 11 predictor variables were: IYB1, IB1, SLB1, LI1, IBSLB1, IB1S, IB2, SLB2, LI2, LSL2 and IBSLB2. This led to selecting the variables {IYBI, LI1, LI2} for Group 0 and {IYB1, LI2, SLB1, LSL2, IBSLB2} for Group 1. The $R^2$ generated by this second model was even higher at 97%.

To apply this approach, the $\beta$ values are stored in the microprocessor ROM and the variables described above are calculated as information about the dryer heater current is received. The processor first divides the load into one or other of the two laundry groups, and then applies the appropriate predictor calculations to determine the best time to shut down the dryer cycle.

This approach has the advantage that the variable AONT can be set for different moisture targets thus allowing the correlation or selection of different moisture levels in the laundry load. Thus by selecting different sets of $\beta$'s, or constants, the user could select different levels of laundry dryness. Incorporated into a machine, the technology could also monitor the level of dryness of the load (and its rate of change) in this manner.

In the appended claims, and in the prior text, the expression "reducing the flow of energy" includes both partial and complete blockage of the energy flow.

While one embodiment of this invention has been illustrated in the accompanying drawings and described hereinabove, it will be evident to those skilled in the art that changes and modifications may be made therein, without departing from the essence of this invention, as set forth in the appended claims.

The embodiment of the invention in which an exclusive property or privilege is claimed are defined as follow:

1. A method of controlling a drying machine to which energy is fed along at least one conduit, the drying machine having means establishing a variable energy consumption, such that, as the contents of the drying machine approach a dry condition, the amount of energy consumed per unit time changes in a pattern which depends upon the amount and nature of the contents and the characteristics and operating conditions of the drying machine, the method comprising the steps:

a) monitoring the pattern of energy consumption, and
  b) through an analysis requiring only said pattern of energy consumption with respect to time, determining when a desired level of dryness is achieved and thereupon reducing the flow of energy used by the drying machine.

2. The method claimed in claim 1, in which the energy is contained in a fluid fuel, in which there is a single said conduit along which said fuel is fed.

3. The method claimed in claim 2, in which the means establishing a variable energy consumption does so by causing the energy flow to cycle on-off, the reduction under b) being a reduction to zero, and the timing of the reduction being close to the end of an "off" phase in the duty cycle, in order to take advantage of heat stored in the drying machine and its contents.

4. The method claimed in claim 1, in which the energy flow reduction under b) is a reduction to zero, the energy being electrical energy, said at least one conduit being an electrically conductive wire, and in which the drying machine has a built-in safety feature whereby it shuts down the machine's use of the electrical energy in said wire whenever there is an interruption in the availability of said electrical energy, such that, whenever the flow of energy is shut off under step b) at least one function of the machine is terminated.

5. The method claimed in claim 1, in which the machine is a clothes dryer, and in which the conduit is one of the two "live" electrical wires of a 220-volt electrical supply which also includes a neutral wire, the machine having an electrical resistance type heating means, an air blower and a drum rotated by an electrical motor, the heating means receiving the full 220 volts across the two "live" wires, the motor being run on 110 volts from one of the "live" wires to the neutral wire, the machine having a built-in safety feature whereby it shuts down the machine's use of the electrical energy in the motor and in the heating means whenever there is an interruption in the availability of electrical energy to the motor, the said step b) being carried out by interrupting the electrical energy in that one of the two "live" wires which does not power the motor, thus terminating the heating while allowing the motor to continue, whereby the motor-driven drum and blower will continue to operate after shut-off of the power to said heating means, thus making use of the heat in the drum and its contents and reducing the creasing of the contents.

6. The method claimed in claim 1, in which the machine is a clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy in the motor and the heating means whenever there is an adequate interruption in the availability of electrical energy to the motor, the step b) being carried out by interrupting the electrical energy at least that one of the "live" wires which feeds the motor, thus terminating the heating and the motor, the interruption being done close to the end of an "off" portion of the duty cycle, thus making use of the heat in the drum and its contents.

7. The method claimed in claim 1, in which, at the time of the reduction of energy flow, an audible and/or visible signal is produced.

8. The method claimed in claim 1, in which, shortly before the reduction of energy flow, a first audible and/or visible "warning" signal is produced, and when the energy flow is actually shut off, a second audible and/or visible signal is produced.

9. The method claimed in claim 6, in which, at the time of the interruption, an audible and/or visible signal is produced.

10. The method claimed in claim 6, in which, shortly before the interruption, a first audible and/or visible "warning" signal is produced, and upon the actual occurrence of interruption, a second audible and/or visible signal is produced.

11. The method claimed in claim 5, in which, after shut-off of the power to the heating means, the motor is allowed to continue for a length of time adequate to allow the drum and its contents to cool, whereupon the electrical energy in the other of the "live" wires is interrupted, thus halting the motor.

12. For use in conjunction with a drying machine to which energy is fed along at least one conduit, the drying machine having means establishing a variable energy consumption such that, as the contents of the drying machine approach a dry condition, the amount of energy used per unit time changes, in a pattern which depends upon the amount and nature of the contents and the characteristics and operating conditions of the drying machine, a control device comprising:
  a) first means for monitoring the pattern of energy used per unit time, and
  b) second means receiving data from said first means and adapted, through an analysis requiring only said pattern of energy consumption with respect to time, to determine when a desired level of dryness is achieved, whereupon the second means reduces the flow of energy along said at least one conduit.

13. The control device claimed in claim 12, in which the energy is a fluid fuel, and in which there is a single said conduit along which said fuel is fed.

14. The control device claimed in claim 13, in which there is a control valve in said conduit, in which the means establishing a variable energy consumption does so by cycling the said valve through an on-off duty cycle, in which the reduction in energy flow accomplished by the second means is a reduction to zero, and in which the second means times the reduction to be close to the end of an "off" phase in the duty cycle, in order to take advantage of heat stored in the drying machine and its contents.

15. The control device claimed in claim 12, in which the energy is electrical energy, said at least one conduit being an electrically conductive wire, and in which the drying machine has a built-in safety feature whereby it shuts down the machine's use of the electrical energy in said wire whenever there is an adequate interruption in the availability of said electrical energy, such that, when analysis of the pattern of energy use with respect to time indicates a desired level of dryness as under step b) at least one function of the machine is terminated.

16. The control device claimed in claim 12, in which the machine is a clothes dryer, and in which the conduit is one of the two "live" electrical wires of a 220-volt electrical supply which aim includes a neutral wire, the machine having an electrical resistance type heating means, a drum rotated by an electrical motor and an air blower operated by the electric motor, the heating means receiving the full 220 volts across the two "live" wires, the motor being run on 110 volts from one of the "live" wires to the neutral wire, the machine having a built-in safety feature whereby it shuts down the machine's use of the electrical energy to the motor and heater whenever there is an adequate interruption in the availability of electrical energy to the motor, said second means interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing creasing of the contents; said "live" and neutral wires being part of an electrical power cord which terminates in an electrical plug, the plug being adapted to mate with and electrical receptacle, the control device being embodied in an adaptor inserted between said plug and said receptacle.

17. The control device claimed in claim 12, in which the machine is a clothes dryer, and in which the conduit is one of the two "live" electrical wires of a 220-volt electrical supply which also includes a neutral wire, the machine having an electrical resistance type heating means, a drum rotated by an electrical motor and an air blower operated by the motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy by whenever there is an adequate interruption in the availability of electrical energy to the motor, the said second means being adapted to accomplish the said reduction in energy flow by interrupting the electrical energy at least to the motor, thus terminating the heating and the motor, the shutting down being done at the end of an "off" portion of the duty cycle, thus making use of the heat in the drum and its contents; said "live" and neutral wires being part of an electrical power cord which terminates in an electrical plug, the plug being adapted to mate with an electrical receptacle, the control device being embodied in an adaptor inserted between said plug and said receptacle.

18. The control device claimed in claim 12, further comprising third means for producing an audible and/or visible signal when the flow of energy is shut off.

19. The control device claimed in claim 12, further comprises third means which, shortly before the shut-off of energy flow, produces a first audible and/or visible "warning" signal, and when the energy flow is actually shut off, produces a second audible and/or visible signal.

20. The control device claimed in claim 17, further comprising third means which, at the time of the interruption, produces an audible and/or visible signal.

21. The control device claimed in claim 17, further comprising third means that, shortly before the interruption, produces a first audible and/or visible "warning" signal, and upon the actual occurrence of interruption, produces a second audible and/or visible signal.

22. The control device claimed in claim 16, in which, after shut-off of the power to the heating means, the motor is allowed to continue for a length of time adequate to allow the drum and its contents to cool, whereupon the electrical energy in the other of the "live" wires is interrupted, thus halting the motor.

23. In combination:
  A. a drying machine to which energy is fed along at least one conduit, the drying machine having means establishing a variable energy consumption such that, as the contents of the drying machine approach a dry condition, the amount of energy used per unit time changes in a pattern which depends upon the amount and nature of the contents and the characteristics and operating conditions of the drying machine, and
  B. a control capability comprising:
    a) first means for monitoring the pattern of energy consumption with respect to time, and
    b) second means requiring only data from said first means pertaining to the pattern of energy consumption with respect to time and adapted, when the pattern of energy consumption with respect to time indicates a desired level of dryness, to reduce the flow of energy along said at least one conduit,
  the control capability being built into the drying machine.

24. The combination claimed in claim 23, in which the energy is a fluid fuel, and in which there is a single said conduit along which said fuel is fed.

25. The combination claimed in claim 24, in which there is a valve in said conduit, in which the means establishing a variable energy consumption does so by cycling the valve through an on-off duty cycle, and in which the second means accomplishes the said reduction in energy flow by shutting down the valve, and times the valve shut-down to be close to the end of an "off" phase in the duty cycle, in order to take advantage of heat stored in the drying machine and its contents.

26. The combination claimed in claim 23, in which the energy is electrical energy, said at least one conduit being an electrically conductive wire, and in which the drying machine has a built-in safety feature whereby it shuts down the machine's use of the electrical energy in the heater and the motor whenever there is an adequate interruption in the availability of said electrical energy to the motor, such that, when analysis of the pattern of energy use with respect to time indicates a desired level of dryness as under step b) at least one function of the machine is terminated.

27. The combination claimed in claim 23, in which the machine is a clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine having a built-in safety feature whereby it shuts down the machine's use of the electrical energy to the motor and to the heater whenever there is an adequate interruption in the availability of electrical energy to the motor, said second means accomplishing the reduction in energy flow by interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing creasing of the contents.

28. The combination claimed in claim 23, in which the machine is clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy to the motor and heater whenever there is an adequate interruption in the availability of electrical energy to the motor, the second means being adapted to accomplish the reduction in energy flow by interrupting the electrical energy at least to that one of the "live" wires that powers the motor, thus terminating the heating and the motor, the interruption being done at the end of an "off" portion of the duty cycle, thus making use of the heat in the drum and its contents.

29. The combination claimed in claim 23, in which the control device further comprises third means for producing an audible and/or visible signal when the flow of energy is shut off.

30. The combination claimed in claim 23, in which the control device further comprises third means which, shortly before the shut-off of energy flow, produces a first audible and/or visible "warning" signal, and when the energy flow is actually shut off, produces a second audible and/or visible signal.

31. The combination claimed in claim 28, in which the control device further comprises third means which, at the time of the interruption, produces an audible and/or visible signal.

32. The combination claimed in claim 28, in which the control device further comprises third means that, shortly before the interruption, produces a first audible and/or visible "warning" signal, and upon the actual occurrence of interruption, produces a second audible and/or visible signal.

33. The combination claimed in claim 27, in which, after shut-off of the power to the heating means, the motor is allowed to continue for a length of time adequate to allow the drum and its contents to cool, whereupon the electrical energy in the other of the "live" wires is interrupted, thus halting the motor.

34. In combination:
A. a clothes drying machine incorporating a heater, a drum, a motor rotating the drum, and an air blower run by said motor, electrical energy being fed to the heater and the motor along two "live" electrical wires of a 220-volt electrical supply which further includes a neutral wire and a ground wire, all wires proceeding from a plug having prongs for insertion into an appropriate receptacle, the machine having a built-in safety feature whereby it shuts down the machine's use of the electrical energy by the heater and motor whenever there is an interruption in the availability of sufficient electrical energy to the motor, the drying machine having means establishing a variable energy consumption such that, as the contents of the drying machine approach a dry condition, the amount of energy used per unit time decreases in a pattern which depends upon the amount and nature of the contents and the characteristics of the drying machine, and
B. a control device comprising:
a) first means for monitoring the pattern of energy consumption with respect to time, and
b) second means requiring only data from said first means pertaining to the pattern of energy consumption with respect to time and adapted, when analysis of the pattern of energy consumption with respect to time indicates a desired level of dryness, to reduce the flow of electrical energy in at least one of said "live" wires,
the control device being separate from the drying machine, and incorporated into an adaptor unit having prongs for insertion into an appropriate receptacle, and itself defining a receptacle for the prongs on the plug for the drying machine, said adaptor unit also containing said first and second means.

35. The combination claimed in claim 34, in which the machine has an electrical resistance type heating means and a drum rotated by an electrical motor, the heating means receiving the full 220 volts across the two "live" wires, the motor being run on 110 volts from one of the "live" wires to the neutral wire, said second means reducing the flow of electrical energy by interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing the creasing of the contents.

36. The combination claimed in claim 34, in which the heater is an electrical resistance type heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the second means being adapted to reduce said flow of electrical energy by interrupting the electrical energy at least to that one of the "live" wires that powers the motor, thus terminating the heating and the motor, the interruption being done close to the end of an "off" portion of the duty cycle, thus making use of the heat in the drum and its contents.

37. The combination claimed in claim 34, in which the control device further comprises third means for producing an audible and/or visible signal when the flow of electrical energy is shut off.

38. The combination claimed in claim 34, in which the control device further comprises third means which, shortly before the shut-off of energy flow, produces a first audible and/or visible "warning" signal, and when the energy flow is actually shut off, produces a second audible and/or visible signal.

39. The combination claimed in claim 35, in which, after shut-off of the power to the heating means, the motor is allowed to continue for a length of time adequate to allow the drum and its contents to cool, whereupon the electrical energy in the other of the "live" wires is interrupted, thus halting the motor.

40. The method claimed in claim 1, in which air passes through the drying machine to remove moisture from the contents thereof, the method further including determining the rate of drying of the contents and controlling the rate of air throughput in order to increase the moisture content of the air and thus improve the efficiency of the machine.

41. The control device claimed in claim 12, wherein air passes through the drying machine to remove moisture from the contents thereof, the device further comprising means for determining the rate of drying of the contents and means for determining and controlling the rate of air throughput in order to increase the moisture content of the air and thus improve the efficiency of the machine.

42. The combination claimed in claim 23, wherein air passes through the drying machine to remove moisture from the contents thereof, the combination further comprising means for determining the rate of drying of the contents and means for determining and controlling the rate of air throughput in order to increase the moisture content of the air and thus improve the efficiency of the machine.

43. The combination claimed in claim 34, wherein said air blower blows air through the drying machine to remove moisture from the contents thereof, the combination further comprising means for determining the rate of drying of the contents and means for determining and controlling the rate of air throughput in order to increase the moisture content of the air and thus improve the efficiency of the machine.

44. A method of controlling a drying machine to which energy is fed along at least one conduit, the drying machine having means establishing a variable energy consumption, such that, as the contents of the machine dry, the amount of energy consumed per unit time changes in a pattern which depends upon the amount and nature of the contents and the characteristics and operating conditions of the drying machine, the method comprising the steps:

a) monitoring the pattern of energy consumption, b) carrying out an analysis requiring only the said pattern of energy consumption to identify the occurrence of an energy flow surplus with respect to the condition and drying pattern of the contents, and c) when such surplus occurs, reducing the flow of energy used by the machine.

45. The method claimed in claim 44, in which air passes through the machine in order to carry moisture away, and in which the reduction in the flow of energy is accomplished by reducing the flow of said air to increase the moisture content of the air and thus improve the efficiency of the machine.

46. The method claimed in claim 44, in which the analysis under b) determines the satisfactory dryness of the contents, and the reduction of energy flow under c) brings about the ultimate termination of the drying cycle.

* * * * *